(12) United States Patent
Sakakura et al.

(10) Patent No.: US 8,913,369 B2
(45) Date of Patent: Dec. 16, 2014

(54) ELECTROLYTIC SOLUTION FOR ALUMINUM ELECTROLYTIC CAPACITOR, AND ALUMINUM ELECTROLYTIC CAPACITOR

(71) Applicant: Nippon Chemi-Con Corporation, Tokyo (JP)

(72) Inventors: Masao Sakakura, Tokyo (JP); Junichi Kawakami, Tokyo (JP); Kazuma Okura, Tokyo (JP); Shingo Takeuchi, Tokyo (JP); Masashi Ozawa, Tokyo (JP); Kenji Tamamitsu, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

(21) Appl. No.: 14/166,449

(22) Filed: Jan. 28, 2014

(65) Prior Publication Data

US 2014/0133066 A1    May 15, 2014

Related U.S. Application Data

(62) Division of application No. 13/258,507, filed as application No. PCT/JP2009/003262 on Jul. 11, 2009, now Pat. No. 8,675,347.

(30) Foreign Application Priority Data

Mar. 31, 2009   (JP) ................................. 2009-088569
Mar. 31, 2009   (JP) ................................. 2009-088573

(51) Int. Cl.
| | |
|---|---|
| H01G 9/02 | (2006.01) |
| H01G 9/145 | (2006.01) |
| H01G 9/045 | (2006.01) |
| H01G 9/035 | (2006.01) |

(52) U.S. Cl.
CPC ............... *H01G 9/035* (2013.01); *H01G 9/145* (2013.01); *H01G 9/045* (2013.01)
USPC .......................... 361/505; 361/503; 252/62.2

(58) Field of Classification Search
CPC .......... H01G 9/04; H01G 9/042; H01G 9/045
USPC .................................. 361/502–505; 252/52.2
See application file for complete search history.

(56) References Cited

U.S. PATENT DOCUMENTS

| | | | |
|---|---|---|---|
| 4,509,094 A | 4/1985 | Finkelstein et al. | |
| 5,661,629 A | 8/1997 | MacFarlane et al. | |

(Continued)

FOREIGN PATENT DOCUMENTS

| | | |
|---|---|---|
| CN | 1261720 A | 8/2000 |
| CN | 1974843 A | 6/2007 |

(Continued)

OTHER PUBLICATIONS

First Notice of the Opinion on Examination for corresponding Chinese Patent Application No. 200980158503.9, dated Aug. 6, 2012.

(Continued)

*Primary Examiner* — Eric Thomas
(74) *Attorney, Agent, or Firm* — Birch, Stewart, Kolasch & Birch, LLP

(57) ABSTRACT

Disclosed are an aluminum electrolytic capacitor having low impedance properties and a long service life, and an electrolytic solution which enables to give such capacitor. The electrolytic solution contains a solvent containing water, a phosphorus oxoacid ion-generating compound which can generate a phosphorus oxoacid ion in an aqueous solution, and a chelating agent which can coordinate with aluminum to form an aqueous aluminum chelate complex. The electrolytic solution further contains a compound selected from the group consisting of azelaic acid and an azelaic acid salt, and a compound selected from the group consisting of formic acid, a formic acid salt, adipic acid, an adipic acid salt, glutaric acid and a glutaric acid salt. The content of azelaic acid and/or the azelaic acid salt is at least 0.03 moles per kg of the solvent. When the electrolytic solution is used in an electrolytic capacitor which utilizes an anode having an aluminum oxide film containing phosphorus in an amount of 30 to 150 mg per unit CV product in terms of phosphoric acid, the service life of the capacitor is remarkably prolonged.

8 Claims, 1 Drawing Sheet

(56) References Cited

U.S. PATENT DOCUMENTS

| | | |
|---|---|---|
| 6,288,889 B1 | 9/2001 | Komatsu et al. |
| 6,493,211 B1 | 12/2002 | Sugiyama et al. |
| 7,054,140 B2 | 5/2006 | Ozawa et al. |
| 7,279,117 B2 | 10/2007 | Komatsu et al. |
| 7,660,101 B2 | 2/2010 | Komatsu et al. |
| 2005/0094352 A1 | 5/2005 | Komatsu et al. |
| 2006/0278842 A1 | 12/2006 | Wang |
| 2007/0121276 A1 | 5/2007 | Uzawa et al. |
| 2007/0171595 A1 | 7/2007 | Komatsu et al. |

FOREIGN PATENT DOCUMENTS

| | | |
|---|---|---|
| DE | 28 36 878 B1 | 11/1979 |
| EP | 1 006 536 A2 | 6/2000 |
| EP | 1 170 761 A1 | 1/2002 |
| JP | 6-61099 A | 3/1994 |
| JP | 2002-270473 A | 9/2002 |
| WO | WO 00/55876 A1 | 9/2000 |

OTHER PUBLICATIONS

International Search Report, dated Sep. 15, 2009, issued in PCT/JP2009/003262.

Supplementary European Search Report for corresponding European Patent Application No. 09842581.2, mailed Dec. 14, 2012.

ELECTROLYTIC SOLUTION FOR ALUMINUM ELECTROLYTIC CAPACITOR, AND ALUMINUM ELECTROLYTIC CAPACITOR

CROSS-REFERENCE TO RELATED APPLICATIONS

This application is a Divisional of application Ser. No. 13/258,507 filed on Sep. 22, 2011, now U.S. Pat. No. 8,675,347. Application Ser. No. 13/258,507 is a National Phase of PCT International Application No. PCT/JP2009/003262 filed on Jul. 11, 2009, which claims priority under 35 U.S.C. 119(a) to Patent Application No. 2009-088569X-088573 filed in Japan on Mar. 31, 2009 and Patent Application No. 2009-088573 filed in Japan on Mar. 31, 2009. All of the above applications are hereby expressly incorporated by reference into the present application.

BACKGROUND OF THE INVENTION

1. Field of the Invention

The present invention relates to an electrolytic solution for an electrolytic capacitor that enables to give an aluminum electrolytic capacitor having low impedance properties and a long service life. The present invention also relates to an aluminum electrolytic capacitor with low impedance properties and a long service life utilizing the electrolytic solution and/or an electrode that is proof against deterioration.

2. Description of the Related Art

An aluminum electrolytic capacitor has a constitution that houses in a sealing package an anode constructed from aluminum foil with an aluminum oxide film on the surface, a cathode constructed from aluminum foil, and a separator holding an electrolytic solution located between the anode and the cathode. The capacitors with a wound or laminated structure are widely used.

What are conventionally known as the electrolytic solutions for activating a small, low voltage aluminum electrolytic capacitor are one with ethylene glycol as a main solvent and a carboxylic acid such as adipic acid and benzoic acid or a carboxylic acid such as an ammonium salt as an electrolyte, and one with γ-butyrolactone as a main solvent and a quaternary cyclic amidinium salt or the like of a carboxylic acid such as phthalic acid and maleic acid as an electrolyte.

With downsizing of electronic devices in recent years, low impedance properties are demanded for such aluminum electrolytic capacitor. The low impedance properties are also required in using the capacitor under high frequency conditions. To meet these requirements, use of a highly conductive electrolytic solution with a low specific resistance is desirable, and studies based on the electrolytic solution with ethylene glycol as s main solvent and a carboxylic acid and/or a carboxylic salt as electrolytes have been conducted to lower a specific resistance by increasing the water content in the electrolytic solution.

However, water as well as the carboxylic acid and/or the carboxylic salt as the electrolytes in the electrolytic solution is chemically active substance for the anode and the cathode that are constructed from aluminum foil. The aluminum oxide film on the surface of the electrode dissolves by reaction with carboxylic acid anions, and carboxylic acid complexes of aluminum are formed. Additionally, when water reaches an aluminum part through the aluminum oxide film on the surface of the electrode, aluminum dissolves, hydroxides of aluminum are formed, and concurrently with this reaction, hydrogen gas is generated. Therefore, there is a problem that, when the water content in the electrolytic solution is increased, the electrode foil deteriorates, a leakage current of the capacitor increases, and a service life of the capacitor is reduced. Especially, in a high-temperature life test at 105° C. or more, when the water content exceeds 15% by weight of the solvent, hydrogen gas is massively generated by the above-mentioned reaction in an abrupt manner, and a pressure within the capacitor increases by the gas. This results in opening of a safety valve, and the capacitor becomes unusable.

Addition of phosphoric acid to the electrolytic solution in order to prevent this deterioration of the electrode foil is conventionally known. If a moderate amount of phosphate ions exists in the electrolytic solution, the dissolution of aluminum in the anode and the cathode as well as the formation of the hydroxides and other reaction products is inhibited, and the generation of hydrogen gas is also inhibited.

However, when phosphoric acid is added to the electrolytic solution, phosphate ions are combined with aluminum ions that are eluted into the electrolytic solution and form compounds that do not dissolve in the electrolytic solution. These insoluble compounds then attach to the electrode foil and the phosphate ions disappear from the electrolytic solution. Therefore, preventing the deterioration of the electrode foil by the phosphate ions is not sufficient. Additionally, if an added amount of phosphate acid in the electrolytic solution is excessive, the aluminum oxide film on the surface of the electrode dissolves by reaction with the phosphate ions and the leakage current of the capacitor increases. To deal with these problems, the applicants have taken into consideration the fact that capacitor properties are well maintained while the adequate amount of phosphate ions exist in the electrolytic solution, and have disclosed, in WO00/55876, addition to a water-containing electrolytic solution a compound that generates a phosphate ion in an aqueous solution and a chelating agent that forms an aqueous aluminum chelate complex by coordination with aluminum, in order to produce a combined product of an aqueous aluminum chelate complex and a phosphate ion by reaction of the aluminum ion eluted from the electrode foil and the chelating agent and the phosphate ion. Because the combined product of an aqueous aluminum chelate complex and a phosphate ion maintains chemical equilibrium with the phosphate ions in the electrolytic solution in the state that it is dissolved in the electrolytic solution or attaches to the electrode foil, it can prolong the duration time for the adequate amount of the phosphate ions to exist in the electrolytic solution and prevent the deterioration of the anode and the cathode for a long period.

BRIEF SUMMARY OF THE INVENTION

1. Problems to be Solved by the Invention

According to the method disclosed in WO00/55876, if the water content in the electrolytic solution increases, dissolution the of aluminum in electrode foil, the formation of the hydroxides and other reaction products, and the generation of hydrogen gas can be inhibited, thus, low impedance and a long service life of the aluminum electrolytic capacitor can be achieved. However, further requisition for lower impedance and a longer service life of the capacitor always exists.

The inventors conducted studies to meet this further requisition and have found that, in addition to increasing the water content in the electrolytic solution, by using a carboxylic acid and/or a carboxylic salt selected from formic acid, a formic acid salt, adipic acid, an adipic acid salt, glutaric acid and a glutaric acid salt as the electrolyte, it was possible to lower the specific resistance of the electrolytic solution effectively, however, the reaction of the carboxylic acid anions and the aluminum oxide film as well as that of water and aluminum became significant and the elution of aluminum from the aluminum foil could not be adequately inhibited. Therefore, it was found that, even if the combined product of a phosphate ion and an aluminum chelate complex existed in the electrolytic solution, the service life of the capacitor was not satisfactory enough. Especially, formic acid and/or the formic acid salt as the electrolytes significantly lowered the specific resistance of the electrolytic solution, but the service life of the capacitor also lowered significantly. Therefore, to meet the requisition mentioned above, it is desirable to include in the electrolytic solution a compound to inhibit the dissolution of aluminum from the electrode foil. Additionally, to prolong the life span of the capacitor, electrode foil that is less prone to react with water and the carboxylic anions in the electrolytic solution and resists the dissolution of aluminum is desirable.

It is therefore an object of the present invention to provide an electrolytic solution for an aluminum electrolytic capacitor with a low specific resistance that is capable of inhibiting aluminum elusion from electrode foil. Another object of the present invention is to provide an aluminum electrolytic capacitor having low impedance properties and a longer service life, especially the one having a longer service life in a high-temperature life test, which uses the above-mentioned preferred electrolytic solution and/or electrode foil from which aluminum is hard to be dissolved.

2. Means for Solving Problems

The inventors found after dedicated consideration that the above object was accomplished by simultaneous use of a compound selected from the group consisting of azelaic acid and a azelaic acid salt and a combined product of a phosphorus oxoacid ion and an aqueous aluminum chelate complex in an electrolytic solution for an aluminum electrolytic capacitor comprising a solvent containing water and an electrolyte selected from formic acid, a formic acid salt, adipic acid, an adipic acid salt, glutaric acid and a glutaric acid salt, which significantly lowers a specific resistance of the electrolytic solution. if the compound selected from azelaic acid and an azelaic acid salt, which also acts as an electrolyte, coexists in an amount of 0.03 moles or more per kg of the solvent, the dissolution of aluminum in the anode and the cathode of the capacitor, the formation of hydroxides of aluminum and other reaction products and the incidental generation of hydrogen gas are inhibited. Further, if the combined product of a phosphorus oxoacid ion and an aqueous aluminum chelate complex coexists in the electrolytic solution, it can prolong the duration time for the adequate amount of phosphorus oxoacid ions to exist in the electrolytic solution because the combined product maintains chemical equilibrium with phosphorus oxoacid ions in the electrolytic solution in the state that it is dissolved in the electrolytic solution or attaches to the electrode foil. The phosphorus oxoacid ions also inhibit the dissolution of aluminum in the anode and the cathode of the capacitor, the formation of the hydroxides and other reaction products, and the generation of hydrogen gas. By a synergistic effect of the combined product and azelaic acid and/or the azelaic acid salt, the dissolution of aluminum in the anode and the cathode of the capacitor, the formation of the hydroxides and other reaction products, and the generation of hydrogen gas are surprisingly inhibited Though it is not clear at present, azelaic acid and/or the azelaic acid salt are considered to not only act as the mere electrolytes but form protective layers by adhering to the surfaces of the anode and the cathode of the capacitor.

Therefore, the present invention relates to the first electrolytic solution for an aluminum electrolytic capacitor comprising a solvent containing water, electrolytes selected from the group consisting of a carboxylic acid and a carboxylic salt, a phosphorus oxoacid ion-generating compound which can generate a phosphorus oxoacid ion in an aqueous solution, and a chelating agent which can coordinate with aluminum to form an aqueous aluminum chelate complex, wherein the electrolytic solution comprises, as the electrolytes, at least one compound selected from the group consisting of azelaic acid and an azelaic acid salt and at least one compound selected from the group consisting of formic acid, a formic acid salt, adipic acid, an adipic acid salt, glutaric acid and a glutaric acid salt, and the content of the at least one compound selected from the group consisting of azelaic acid and an azelaic acid salt is at least 0.03 moles per kg of the solvent and at most a saturated amount at 50° C. in the electrolytic solution.

The present invention further relates to the second electrolytic solution for an aluminum electrolytic capacitor comprising a solvent containing water, electrolytes selected from the group consisting of a carboxylic acid and a carboxylic salt, a phosphorus oxoacid ion-generating compound which can generate a phosphorus oxoacid ion in an aqueous solution; and a chelating agent which can coordinate with aluminum to form an aqueous aluminum chelate complex, wherein the electrolytic solution comprises, as the electrolytes, at least one compound selected from the group consisting of azelaic acid and an azelaic acid salt in an amount of 0.03 to 0.5 moles per kg of the solvent and at least one compound selected from the group consisting of formic acid, a formic acid salt, adipic acid, an adipic acid salt, glutaric acid and a glutaric acid salt.

In the context of the present invention, "a phosphorus oxoacid ion" includes a phosphate ion, a phosphite ion, a hypophosphite ion as well as isomers thereof, namely a phosphonate ion and a phosphinate ion. "A phosphorus oxoacid ion-generating compound" includes a compound generating a phosphorus oxoacid ion when the compound is solved into the solvent, as well as a compound generating a phosphorus oxoacid ion through oxidation at the anode after the electrolytic solution is introduced into the capacitor. The electrolytic solution for an aluminum electrolytic capacitor of the present invention comprises a large amount of water to lower a specific resistance. Therefore, the compound that generates a phosphorus oxoacid ion in water solution also generates a phosphorus oxoacid ion in the electrolytic solution of the present invention, and a chelating agent that forms an aqueous aluminum chelate complex by coordinating with aluminum also forms an aluminum chelate complex that solves into the electrolytic solution of the present invention.

If an aluminum ion coexists in the first and the second electrolytic solutions of the present invention, the combined product of a phosphorus oxoacid ion and an aqueous aluminum chelate complex is formed in the electrolytic solution by reaction with the aluminum ion and the chelating agent and a phosphorus oxoacid ion generated from the phosphorus oxoacid ion-generating compound. It is possible to include the aluminum ion in the electrolytic solution previously by adding an aluminum salt to the electrolytic solution. However, when the electrolytic solution which includes the phosphorus oxoacid ion-generating compound and the chelating agent but does not include an aluminum ion is introduced into the aluminum electrolytic capacitor, the electrolytic solution in the capacitor includes the combined product of a phosphorus oxoacid ion and an aqueous aluminum chelate complex because the aluminum ion is eluted from the electrode foil. By the synergetic effect of the combined product and azelaic acid and/or the azelaic acid salt, the dissolution of aluminum in the anode and the cathode, the formation of the hydroxides and other reaction products, and the generation of hydrogen gas are inhibited. Therefore, the capacitor with a longer service life can be obtained, even if the water content in the electrolytic solution is increased and the compound selected from the group consisting of formic acid, a formic acid salt, adipic acid, an adipic acid salt, glutaric acid and a glutaric acid salt, which significantly lowers a specific resistance of the electrolytic solution, is used as the electrolyte.

In the first electrolytic solution of the present invention, the content of the compound selected from the group consisting of azelaic acid and an azelaic acid salt is at least 0.03 moles per kg of the solvent and at most the saturated amount at 50° C. in the electrolytic solution. Since the temperature of the electrolytic solution in the capacitor is 50° C. or more under normal conditions of use of the capacitor, azelaic acid and/or the azelaic acid salt are completely dissolved into the electrolytic solution and act as the electrolytes. In the first electrolytic solution of the present invention, the added amount of azelaic acid and/or the azelaic acid salt is regarded as the saturated amount at 50° C. or less in the electrolytic solution, in case a fluid is prepared by solving the components other than azelaic acid and/or the azelaic acid salt in the solvent, the fluid is warmed to 70° C., then the desired amount of azelaic acid and/or the azelaic acid salt is added and solved into the fluid, and then the temperature of the fluid is lowered to 50° C., and no precipitate is found after the fluid is stored for one hour at 50° C.

If azelaic acid and/or the azelaic acid salt are less than 0.03 moles per kg of the solvent, the effect of the present invention to inhibit the elution of aluminum in the anode and the cathode, the formation of the hydroxides and other reaction products, and the generation of hydrogen gas is not sufficient. If azelaic acid and/or the azelaic acid salt are more than the saturated amount at 50° C. in the electrolytic solution, it is not preferable because precipitation of azelaic acid and/or the azelaic acid salt from the electrolytic solution at a low temperature becomes remarkable.

In the second electrolytic solution of the present invention, the content of the compound selected from the group consisting of azelaic acid and an azelaic acid salt in the solution is from 0.03 to 0.5 moles, preferably from 0.03 to 0.3 moles, per kg of the solvent. If the content of azelaic acid and/or the azelaic acid salt is less than 0.03 moles per kg of the solvent, the effect of the present invention to inhibit the elution of aluminum in the anode and the cathode, the formation of the hydroxides and other reaction products, and the generation of hydrogen gas is not sufficient. If the content of azelaic acid and/or the azelaic acid salt is more than 0.5 moles per kg of the solvent, azelaic acid or the azelaic acid salt sometimes precipitates from the electrolytic solution at a low temperature. Moreover, the effect of the present invention is not in proportion to the added amount with the increased amount of azelaic acid and/or the azelaic acid salt in the electrolytic solution. The service life of the capacitor becomes almost equivalent when the content of azelaic acid and/or the azelaic acid salt in the solution exceeds 0.3 moles per kg of the solvent.

In the first and the second electrolytic solution of the present invention, the elution of aluminum in the anode and the cathode, the formation of the hydroxides and other reaction products, and the generation of hydrogen gas are sufficiently inhibited by the synergetic effect of the combined product of a phosphorus oxoacid ion and an aqueous aluminum chelate complex and azelaic acid and/or the azalaic acid salt, even if the content of water and the compound selected from the group consisting of formic acid, a formic acid salt, adipic acid, an adipic acid salt, glutaric acid and a glutaric acid salt in the electrolytic solution is increased until a specific resistance of the electrolytic solution becomes 300 cm or less at 30° C. Therefore, the aluminum electrolytic capacitor with low impedance properties and a longer service life can be preferably obtained, and this capacitor shows a longer service life in a no-load life test at 105° C.

By introducing into an aluminum electrolytic capacitor the electrolytic solution of the present invention that comprises the phosphorus oxoacid ion-generating compound that can generate a phosphorus oxoacid ion in the aqueous solution and the chelating agent that can coordinate to aluminum to form an aqueous aluminum chelate complex, and further comprises the compound selected from the group consisting of formic acid, a formic acid salt, adipic acid, an adipic acid salt, glutaric acid and a glutaric acid salt, the aluminum electrolytic capacitor with low impedance properties and a longer service life can be obtained. Therefore, the present invention further relates to an aluminum electrolytic capacitor comprising an anode constructed from aluminum foil with an aluminum oxide film on the surface, a cathode constructed from aluminum foil, and a separator holding an electrolytic solution located between the anode and the cathode, wherein the first or the second electrolytic solution of the present invention is used as the electrolytic solution, thus, the combined product of an aqueous aluminum chelate complex and a phosphorus oxoacid ion as well as the adequate amount of azelaic acid and/or the azelaic acid salt are contained in the electrolytic solution of the capacitor.

Service life of an aluminum electrolytic capacitor is also affected by electrode foil as well as an electrolytic solution, because the service life of the capacitor is determined by close interaction between the electrolytic solution and the electrode foil. The inventors have found after dedicated consideration to the electrode foil that the aluminum oxide film of the anode becomes hard to be dissolved by carboxylic acid anions in the electrolytic solution by including phosphorous in the aluminum oxide film. Therefore, it is also preferable in the capacitor of the present invention using the first or the second electrolytic solution to include phosphorous in the aluminum oxide film of the anode.

The combined product of a phosphorus oxoacid ion and an aqueous aluminum chelate complex in the electrolytic solution having the water-containing solvent maintains chemical equilibrium with the phosphorus oxoacid ions in the electrolytic solution in the state that it is dissolved in the electrolytic solution or attached to the electrode foil. While an adequate amount of the phosphorus oxoacid ions exists in the electrolytic solution, the dissolution of aluminum in the anode and the cathode, the formation of the hydroxides and other reaction products, and the generation of hydrogen gas are inhibited. However, if the aluminum oxide film on the anode is dissolved by the carboxylic acid anions in the electrolytic solution, the elution of aluminum into the electrolytic solution is accelerated and the phosphorus oxoacid ions are rapidly consumed by the aluminum ions eluded into the electrolytic solution. For the reason, the phosphorus oxoacid ions in the electrolytic solution become less than the adequate amount, and the deterioration of the anode and the cathode occurs. Especially, the deterioration of the cathode is more serious than that of the anode because only an extremely thin aluminum oxide film exists on the surface of the cathode. However, if the aluminum oxide film on the anode becomes inhibited from being dissolved by the carboxylic acid anions in the electrolytic solution, the consumption rate of the phosphorus oxoacid ions in the electrolytic solution is lowered. Therefore, the time duration that the adequate amount of the phosphorus oxoacid ions exists in the electrolytic solution is prolonged. As a result, the deterioration of the cathode as well as the anode is inhibited and the service life of the capacitor is prolonged.

Especially, simultaneous use of an anode having phosphorus in an amount of 30 mg or more per unit CV product in terms of phosphoric acid in the aluminum oxide film and an electrolytic solution containing the combined product of an aqueous aluminum chelate complex and a phosphorus oxoacid ion surprisingly inhibits the dissolution of aluminum in the anode and the cathode, the formation of the hydroxides and other reaction products, and the concurrent generation of hydrogen gas by a synergistic effect of the combined product and the preferable anode, even if a specific resistance of the electrolytic solution is lowered by increasing the content of water and the carboxylic acid and/or the carboxylic salt in the electrolytic solution. As a result, the aluminum electrolytic capacitor with low impedance properties as well as a longer service life, especially the one having a longer service life in a high temperature life test, can be obtained.

Therefore, the present invention further relates to an aluminum electrolytic capacitor comprising an anode constructed from aluminum foil with an aluminum oxide film on the surface, a cathode constructed from aluminum foil, and a separator holding an electrolytic solution located between the anode and the cathode, wherein the anode comprises phosphorus in an amount of 30 to 150 mg per unit CV product in terms of phosphoric acid in the aluminum oxide film, and the electrolytic solution comprises a solvent containing water, an electrolyte selected from the group consisting of a carboxylic acid and a carboxylic salt, and a combined product of a phosphorus oxoacid ion and an aqueous aluminum chelate complex. Phosphorus oxoacid ion can be generated from the above-mentioned phosphorus oxoacid ion-generating compound which can generate a phosphorus oxoacid ion in an aqueous solution, and the aqueous aluminum chelate complex can be formed by reaction of the chelating agent which can coordinate with aluminum to form an aqueous aluminum chelate complex and an aluminum ion, preferably the aluminum ion eluded from the anode and the cathode of the capacitor.

In the context of the present invention, the letter "C" in the term "CV product" means a capacitance of aluminum oxide dielectrics in the anode, and the letter "V" means a film withstand voltage of the anode. If the content of phosphorus in the aluminum oxide film is less than 30 mg per unit CV product in terms of phosphoric acid, the effect to inhibit the dissolution of the aluminum oxide film is not sufficient. If the content of phosphorus in the aluminum oxide film is more than 150 mg per unit CV product in terms of phosphoric acid, it is economically disadvantageous because the effect of the present invention becomes saturated, and the capacitance of the capacitor adversely decreases.

Although it is not clear at present, it is considered that phosphorous does not exist in the form of phosphoric acid in aluminum oxide but intrudes into the crystal lattice of aluminum oxide as phosphorous. However, in the present invention, the amount of phosphorous is measured by completely dissolving the anode foil in hydrochloric acid and determining the quantity of phosphoric acid ions in the hydrochloric acid solution by the molybdenum blue method, so that the amount of phosphorous is defined as that of phosphoric acid. When the amount of phosphoric acid per unit CV product is determined, a capacitance (C) of the aluminum oxide dielectrics in the anode is firstly measured, then a film withstand voltage (V) is measured from a volt-time curve, then the amount of phosphoric acid is measured by the above-mentioned method, and then the amount of phosphoric acid per unit CV product is calculated by dividing the amount of phosphoric acid obtained by the product of the capacitance (C) and the film withstand voltage (V).

In an aluminum electrolytic capacitor, a capacitance of aluminum oxide dielectrics in an anode is represented as $$C = \epsilon_0 \epsilon S/d$$

where $\epsilon_0$ is the permittivity of vacuum, $\epsilon$ is the relative permittivity of the dielectrics, S is the surface area (m$^2$) of the dielectrics, and d is the thickness (m) of the dielectrics. In general, d and V are linked by the following relation:

$$d \approx 1.4 \times 10^{-9} \times V$$

Thus, the following equation is derived.

$$CV = \epsilon_0 \epsilon S \times V/1.4 \times 10^{-9} \times V = \epsilon_0 \epsilon S/1.4 \times 10^{-9}$$

Therefore, the amount of phosphorous per unit CV product is in proportion to the amount of phosphorous per unit surface area.

It is preferable to introduce phosphorous into the aluminum oxide film of the anode by a formation treatment of the anode in an aqueous solution comprising at least one compound selected from the group consisting of phosphoric acid and a phosphoric salt, because phosphorous can be introduced thereby in an even and steady manner near the surface of the aluminum oxide film. In the anode thus obtained, it has been found that phosphorous exists near the surface of the aluminum oxide film in high concentration. Therefore, in the present invention, the range of the amount of phosphorous in the aluminum oxide film is defined by the amount of phosphorous per unit CV product which is in proportion to the amount thereof per unit surface area.

In the capacitor of the present invention using the combination of the anode having phosphorus in an amount of 30 to 150 mg/CV in terms of phosphoric acid in the aluminum oxide film and the electrolytic solution containing the combined product of an aqueous aluminum chelate complex and a phosphorus oxoacid ion, the dissolution of aluminum in the anode and the cathode, the formation of the hydroxides of aluminum and other reaction products, and the concurrent generation of hydrogen gas are sufficiently inhibited by the synergistic effect of the combined product of a phosphorus oxoacid ion and an aqueous aluminum chelate complex and the anode with the aluminum oxide film containing the adequate amount of phosphorous, even if the content of water and the electrolyte selected from the group consisting of a carboxylic acid and a carboxylic salt in the electrolytic solution is increased until a specific resistance of the electrolytic solution becomes 300 cm or less at 30° C. As a result, the aluminum electrolytic capacitor with lower impedance properties as well as a longer service life can be preferably obtained, and the capacitor obtained shows a longer service life in a non-load life test at 105° C. It is preferable to use the electrolytic solution of which the water content is from 20 to 80% by weight of the overall electrolytic solution. If the water content is less than 20% by weight, the specific resistance of the electrolytic solution becomes too large at a low temperature. If the water content is more than 80% by weight, a freezing point of the electrolytic solution becomes higher and the warranty scope of the capacitor becomes too narrow.

In the capacitor of the present invention using the combination of the anode having phosphorus in an amount of 30 to 150 mg/CV in terms of phosphoric acid in the aluminum oxide film and the electrolytic solution containing the combined product of an aqueous aluminum chelate complex and a phosphorus oxoacid ion, it is preferable that the electrolytic solution comprises, as the electrolyte, at least one compound selected from the group consisting of formic acid, a formic acid salt, adipic acid, an adipic acid salt, glutaric acid and a glutaric acid salt. These electrolytes effectively lower the specific resistance of the electrolytic solution. Especially formic acid and/or the formic acid salt remarkably lower the specific resistance. However, even if these electrolytes exist in the electrolytic solution, the capacitor with a the longer service life can be obtained by the synergetic effect of the combined product of a phosphorus oxoacid ion and an aqueous aluminum chelate complex and the anode with the aluminum oxide film containing the adequate amount of phosphorous. Additionally, it is preferable that the electrolytic solution comprises, as the electrolyte, at least one compound selected from the group consisting of azelaic acid and an azelaic acid salt because the service life of the capacitor is further prolonged by the protection effect of azelaic acid and/or the azelaic acid salt.

As the electrolytic solution used in the aluminum electrolytic capacitor having the anode with phosphorus in an amount of 30 to 150 mg per unit CV product in terms of phosphoric acid in the aluminum oxide film, it is preferable to use the electrolytic solution of the present invention comprising a solvent containing water, the adequate amount of azelaic acid and/or the azelaic acid salt, the compound selected from the group consisting of formic acid, a formic acid salt, adipic acid, an adipic acid salt, glutaric acid and a glutaric acid salt, and the combined product of a phosphorus oxoacid ion and an aqueous aluminum chelate complex. This aluminum electrolytic capacitor using the electrolytic solution of the present invention shows low impedance properties, and shows very long service life especially in a high-temperature life test by the joint effect come from azelaic acid and/or the azelaic acid salt, the combined product of a phosphorus oxoacid ion and an aqueous aluminum chelate complex, and the anode from which aluminum is hard to be dissolved.

3. Advantageous Effect of the Invention

By using the electrolytic solution for an aluminum electrolytic capacitor of the present invention comprising the phosphorus oxoacid ion-generating compound which can generate a phosphorus oxoacid ion in an aqueous solution, the chelate agent which can coordinate with aluminum to form an aqueous aluminum chelate complex, as well as the electrolytes containing the adequate amount of azelaic acid and/or the azelaic acid salt, and the compound selected from the group consisting of formic acid, a formic acid salt, adipic acid, an adipic acid salt, glutaric acid and the glutaric acid, the combined product of a phosphorus oxoacid ion and an aqueous aluminum chelate complex is formed in the electrolytic solution introduced in the aluminum electrolytic capacitor, and the elution of aluminum in the anode and the cathode of the capacitor, the formation of the hydroxides of aluminum and other reaction products, and the generation of hydrogen gas are remarkably inhibited by the synergetic effect of the combined product and azelaic acid and/or the azelaic acid salt. Therefore, the electrolytic solution of the present invention leads to an aluminum electrolytic capacitor with low impedance properties as well as a longer service life.

Additionally, the capacitor of the present invention using the combination of the anode having phosphorus in an amount of 30 to 150 mg/CV in terms of phosphoric acid in the aluminum oxide film and the electrolytic solution containing the combined product of an aqueous aluminum chelate complex and a phosphorus oxoacid ion has low impedance properties and a long service life, because the elution of aluminum in the anode and the cathode, the formation of the hydroxides and other reaction products, and the generation of hydrogen gas are remarkably inhibited by the synergetic effect of the combined product and the anode.

EXPLANATION OF REFERENCES

Figure 1:
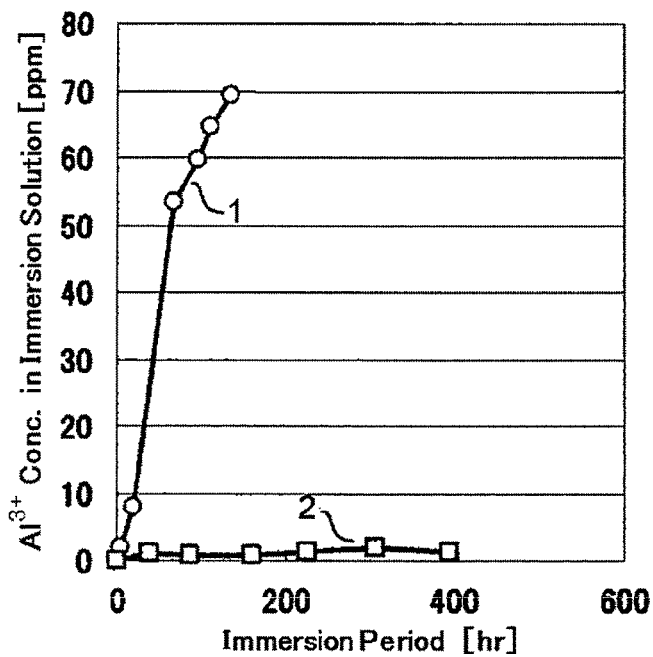
FIG. 1 shows a result of research on inhibition effect of azelaic acid against dissolution of aluminum from an electrode.

1 Use a solution containing adipic acid and formic acid
2 Use a solution containing azelaic acid and formic acid
3 Use an electrode without phosphorus in an aluminum oxide film
4 Use an electrode with phosphorus of 30 mg/CV in terms of phosphoric acid in an aluminum oxide film
5 Use an electrode with phosphorus of 60 mg/CV in terms of phosphoric acid in an aluminum oxide film
6 Use an electrode with phosphorus of 100 mg/CV in terms of phosphoric acid in an aluminum oxide film

DETAILED DESCRIPTION OF THE INVENTION

The present invention will be described in further detail below.

An electrolytic solution for an aluminum electrolytic capacitor of the present invention comprising a solvent containing water, electrolytes selected from the group consisting of a carboxylic acid and a carboxylic salt, a phosphorus oxoacid ion-generating compound which can generate a phosphorus oxoacid ion in an aqueous solution, and a chelating agent which can coordinate with aluminum to form an aqueous aluminum chelate complex, comprises, as the electrolytes, a compound selected from the group consisting of azelaic acid and an azelaic acid salt in an amount of at least 0.03 moles per kg of the solvent and a compound selected from the group consisting of formic acid, a formic acid salt, adipic acid, an adipic acid salt, glutaric acid and a glutaric acid salt. When the electrolytic solution is placed in an aluminum electrolytic capacitor, a combined product of a phosphorus oxoacid ion and an aqueous aluminum chelate complex is formed in the electrolytic solution by the reaction with an aluminum ion eluded from an anode and a cathode into the electrolytic solution. In spite of the presence of the compound selected from the group consisting of formic acid, a formic acid salt, adipic acid, an adipic acid salt, glutaric acid and a glutaric acid salt, which effectively lowers a specific resistance of the electrolytic solution, the capacitor with a longer service life can be obtained by a synergetic effect of azelaic acid and/or the azelaic acid salt and the combined product of a phosphorus oxoacid ion and an aqueous aluminum chelate complex.

The electrolytic solution for an aluminum electrolytic capacitor of the present invention comprises the solvent containing water. Though the solvent can be water only, it is preferable to use a mixture of water and an organic solvent. Examples of the organic solvent which can be used are protic polar solvents such as monohydric alcohols (e.g., methanol, ethanol, propanol, butanol, hexanol, cyclohexanol, cyclopentanol, benzyl alcohol), polyhydroxylic alcohols and oxyalcohols (e.g., ethylene glycol, propylene glycol, glycerin, methyl cellosolve, ethyl cellosolve, 1,3-butanediol, methoxypropylene glycol); and aprotic solvents such as amides (e.g., N-methylformamide, N,N-dimethylformamide, N-ethylformamide, N,N-diethylformamide, N-methylacetamide, hexamethylphosphoric amide), lactones, cyclic amides, carbonates (e.g., γ-butyrolactone, N-methyl-2-pyrolidone, ethylene carbonate, propylene carbonate), nitriles (e.g., acetonitrile), oxides (e.g., dimethyl sulfoxide). One kind of these solvents can be used alone, but two or more kinds of these solvents can also be used. Especially, the mixture of water and ethylene glycol is preferable because it can dissolve various solutes in large quantity and gives electrolytic solutions having excellent temperature properties.

The water content in the electrolytic solution of the present invention is preferably from 20 to 80% by weight, more preferably from 35 to 70%, and particularly from 45 to 65%, based on the overall electrolytic solution. If the water content is less than 20% by weight, a specific resistance of the electrolytic solution becomes too large at a low temperature. If the water content is more than 80% by weight, a freezing point of the electrolytic solution becomes higher and the warranty scope of the capacitor becomes too narrow. The content of the solvent is preferably from 60 to 90% by weight of the overall electrolytic solution in the light of solubility of azelaic acid and the azelaic acid salt.

The electrolytic solution of the present invention comprises, as the electrolytes selected from the group of a carboxylic acid and a carboxylic salt, the compound selected from the group consisting of azelaic acid and an azelaic acid salt as an essential component. Examples of the azelaic acid salt are an ammonium salt, quaternary ammonium salts such as tetraalkylammonium salts (e.g., tetramethylammonium salt, tetraethylammonium salt, tetrapropylammonium salt, tetrabutylammonium salt, methyltriethylammonium salt, dimethyldiethylammonium salt), pyridinium salts (e.g., 1-methylpyridinium salt, 1-ethylpyridinium salt, 1,3-diethylpyridinium salt), amine salts such as primary amine salts (e.g., methylamine salt, ethylamine salt, propylamine salt, butylamine salt, ethylenediamine salt, monoethanolamine salt), secondary amine salts (e.g., dimethylamine salt, diethylamine salt, dipropylamine salt, ethylmethylamine salt, diphenylamine salt, diethanolamine salt), tertiary amine salts (e.g., trimethylamine salt, triethylamine salt, tributylamine salt, 1,8-diazabicyclo(5.4.0)-undecene-7 salt, triethanolamine salt). One kind of these salts can be used alone, but two or more kinds of these salts can also be used.

The electrolytic solution of the present invention comprises, as the electrolytes selected from the group of a carboxylic acid and a carboxylic salt, the compound selected from the group consisting of formic acid, a formic acid salt, adipic acid, an adipic acid salt, glutaric acid and a glutaric acid salt as an essential component, in addition to the compound selected from the group consisting of azelaic acid and the azelaic acid. These compounds, especially the compound selected from the group consisting of formic acid and a formic acid salt, effectively lower a specific resistance of the electrolytic solution. Examples of the formic acid salt, the adipic acid salt and glutaric acid salt are an ammonium salt, quaternary ammonium salts such as tetraalkylammonium salts (e.g., tetramethylammonium salt, tetraethylammonium salt, tetrapropylammonium salt, tetrabutylammonium salt, methyltriethylammonium salt, dimethyldiethylammonium salt), pyridinium salts (e.g., 1-methylpyridinium salt, 1-ethylpyridinium salt, 1,3-diethylpyridiniuml salt), amine salts such as primary amine salts (e.g., methylamine salt, ethylamine salt, propylamine salt, butylamine salt, ethylenediamine salt, monoethanolamine salt), secondary amine salts (e.g., dimethylamine salt, diethylamine salt, dipropylamine salt, ethylmethylamine salt, diphenylamine salt, diethanolamine salt), tertiary amine salts (e.g., trimethylamine salt, triethylamine salt, tributylamine salt, 1,8-diazabicyclo(5.4.0)-undecene-7 salt, triethanolamine salt). One kind of these salts can be used alone, but two or more kinds of these salts can also be used.

FIG. 1 shows the result of immersing the electrode constructed from the aluminum foil with the aluminum oxide film on the surface into a solution that contains 60 parts by weight of water, 30 parts by weight of ethylene glycol, 6 parts by weight of formic acid and 3 parts by weight of azelaic acid and is neutralized by ammonia water, or a solution that contains 60 parts by weight of water, 30 parts by weight of ethylene glycol, 6 parts by weight of formic acid and 3 parts by weight of adipic acid and is neutralized by ammonia water, and measuring the amount of aluminum ions dissolved from the electrode by the inductively coupled plasma atomic emission spectroscopy. In FIG. 1, the line 1 shows the result using the solution containing adipic acid and formic acid, and the line 2 shows the result using the solution containing azelaic acid and formic acid. As known from FIG. 1, when azelaic acid exists in the solution, few aluminum ions are found in the solution even if formic acid coexists. Although it is not clear at present, it is considered that azelaic acid and/or the azelaic acid salt not only act as the mere electrolytes but attach to the surfaces of the anode and cathode of the capacitor to form protective layers.

The content of azelaic acid and/or the azelaic acid salt in the electrolytic solution of the present invention is at least 0.03 moles per kg of the solvent. If two or more compounds are used, the total amount is at least 0.03 moles per kg of the solvent. If the content of azelaic acid and/or the azelaic acid salt is less than 0.03 moles per kg of the solvent, the effect of the present invention to inhibit the dissolution of aluminum in the anode and the cathode, the formation of the hydroxides of aluminum and other reaction products, and the generation of hydrogen gas is not sufficient.

In the electrolytic solution of the present invention, the maximum content of azelaic acid and/or the azelaic acid salt can be the saturated amount at 50° C. in the electrolytic solution. When two or more compounds are used, the total amount is at most the saturated amount at 50° C. in the electrolytic solution.

Azelaic acid and/or the azelaic acid salt dissolve more than 0.03 moles/kg at 50° C. in the solvent consisting of water alone. The saturated amount of azelaic acid and/or the azelaic acid salt at 50° C. in the electrolytic solution becomes higher as the content of water in the electrolytic solution becomes lower, and becomes lower as the content of the compound selected from the group consisting of formic acid, a formic acid salt, adipic acid, an adipic acid salt, glutaric acid and a glutaric acid salt becomes higher.

The content of azelaic acid and/or the azelaic acid salt is to be more than the saturated amount at 50° C. in the electrolytic solution, because precipitation of azelaic acid or the azelaic acid salt from the electrolytic solution becomes remarkable at a low temperature. If azelaic acid or the azelaic acid salt precipitates from the electrolytic solution in the capacitor, the pH value of the electrolytic solution becomes larger, the dissolution of aluminum in the electrode foil sometimes proceeds. If the content of azelaic acid and/or the azelaic acid salt is the saturated amount or less at 50° C., the pH value of the electrolytic solution does not change large enough to promote the dissolution of aluminum in the electrode foil.

In the electrolytic solution of the present invention, the maximum content of azelaic acid and/or the azelaic acid salt can be 0.5 moles, preferably 0.3 moles, per kg of the solvent. If two or more compounds are used, the total amount is at most 0.5 moles, preferably 0.3 moles per kg of the solvent. If the amount is more than 0.5 moles per kg of the solvent, azelaic acid or the azelaic acid salt sometimes precipitates from the electrolytic solution at a low temperature, especially in the solution with the large content of water and the large content of the compound selected from the group consisting of formic acid, a formic acid salt, adipic acid, an adipic acid salt, glutaric acid and a glutaric acid salt. Additionally, if the content of azelaic acid and/or the azelaic acid salt is more than 0.3 moles per kg of the solvent, the effect of the present invention is no longer in proportion to the added amount. If the content of azelaic acid and/or the azelaic acid salt is more than 0.3 moles per kg of the solvent, the service life of the capacitor is almost equivalent.

Adipic acid, the adipic acid salt, glutaric acid and the glutaric acid salt are inferior to formic acid and the formic acid salt in lowering a specific resistance of the electrolytic solution, but, preferable in further improving the service life because the dissolution of aluminum oxide film by adipic acid anions and glutaric acid anions is slower compared with that by formic acid anions. The electrolytic solution using glutaric acid and/or the glutaric acid salt has a lower specific resistance than the electrolytic solution using the same concentration of adipic acid and/or the adipic acid salt. On the other hand, only a small amount of formic acid and/or the formic acid salt remarkably lowers the specific resistance of the electrolytic solution.

Therefore, in the present invention, the compound selected from the group consisting of formic acid and the formic acid salt is mainly used for the electrolytic solution to obtain the aluminum electrolytic capacitor with extremely low impedance properties and a long service life, and the compound selected from the group consisting of adipic acid, an adipic acid salt, glutaric acid and a glutaric acid salt is mainly used for the electrolytic solution to obtain the aluminum electrolytic capacitor with an extremely long service life and low impedance properties.

As the content of water in the electrolytic solution becomes lower, the content of the compound selected from the group consisting of formic acid, a formic acid salt, adipic acid, an adipic acid salt, glutaric acid and a glutaric acid salt can be higher. However, as the concentration of the compound becomes higher, the effect to lower a specific resistance of the electrolytic solution becomes unproportional to the added amount. Additionally, if formic acid, adipic acid, glutaric acid or salts thereof precipitates from the electrolytic solution of the capacitor, the pH value of the electrolytic solution becomes larger, and the dissolution of aluminum in the electrode foil, the formation of the hydroxides and other reaction products, and the generation of hydrogen gas sometimes proceed.

Therefore, to obtain the aluminum electrolytic capacitor with a long service life and extremely low impedance properties, it is preferable to include in the electrolytic solution the compound selected from the group consisting of formic acid and a formic acid salt in an amount of 0.5 to 3.0 moles per kg of the solvent and the compound selected from the group consisting of adipic acid, an adipic acid salt, glutaric acid and a glutaric acid salt in an amount of 0 to 1.5 moles per kg of the solvent. The water content in this electrolytic solution is preferably 50% by weight or more, preferably 50 to 65% by weight, based on the overall electrolytic solution. In this range, the electrolytic solution with the specific impedance of approximately 10 to 30 $\Omega$cm at 30° C. can be obtained, and this electrolytic solution leads to the aluminum electrolytic capacitor with extremely low impedance. Moreover, the capacitor using the electrolytic solution within this range does not result in valve opening after 4,000 hours is elapsed in a non-load life test at 105° C. It is required for an aluminum electrolytic capacitor with extremely low impedance properties to have a service life long enough not to result in opening of the valve after 4,000 hours is elapsed in the high-temperature non-load life test at 105° C. In conventional studies, there was no capacitor that had extremely low impedance and met this requirement.

In the above-mentioned electrolytic solution, if the content of the compound selected from the group consisting of formic acid and a formic acid salt is less than 0.5 moles per kg of the solvent, the electrolytic solution with an extremely low specific resistance cannot be obtained, and if the content thereof is more than 3.0 moles per kg of the solvent, the dissolution of aluminum in the electrode proceeds and the service life of the capacitor is shortened. In case that the compound selected from the group consisting of adipic acid, an adipic acid salt, glutaric acid and a glutaric acid salt is used together with the compound selected from the group consisting of formic acid and a formic acid salt, the dissolution of aluminum in the electrode proceeds and the service life of the capacitor is shortened if the amount thereof is more than 1.5 moles per kg of the solvent.

Further, to obtain the aluminum electrolytic capacitor with low impedance and an extremely long service life, it is preferable to contain the compound selected from the group consisting of adipic acid, an adipic acid salt, glutaric acid and a glutaric acid salt in the electrolytic solution in an amount of 0.45 to 2.0 moles per kg of the solvent and not to contain formic acid and/or the formic acid salt. In this range, the electrolytic solution with the specific resistance of approximately 20 to 40 $\Omega$cm at 30° C. can be obtained if the water content is 50% by weight or more of the electrolytic solution, and the electrolytic solution with the specific resistance of approximately 40 to 70 $\Omega$cm at 30° C. can be obtained if the water content is 30% by weight of the electrolytic solution. These specific resistance values are remarkably lower than approximately 150 $\Omega$cm of the specific resistance of the conventional electrolytic solution having ethylene glycol as the main solvent and water in an amount of 10% by weight of the overall electrolytic solution, and lower than approximately 80 $\Omega$cm of the specific resistance of the conventional electrolytic solution having γ-butyrolactone as the main solvent. Additionally, the capacitor using the electrolytic solution within this range shows the extremely excellent life-span properties in the high-temperature non-load life test at 105° C.

In the above-mentioned electrolytic solution, if the content of the compound selected from the group consisting of adipic acid, an adipic acid salt, glutaric acid and a glutaric acid salt is less than 0.45 moles per kg of the solvent, the electrolytic solution having a lower specific resistance than the conventional solution cannot be obtained, and if the content thereof is more than 2.0 moles per kg of the solvent, the dissolution of aluminum in the electrode proceeds, the service life of the capacitor is shortened, and the capacitor with an extremely long service life cannot be obtained.

The electrolytic solution of the present invention comprises, as the essential components, the compound selected from the group consisting of azelaic acid and an azelaic acid salt as well as the compound selected from the group consisting of formic acid, a formic acid salt, adipic acid, an adipic acid salt, glutaric acid and a glutaric acid salt, and can further contain other carboxylic acids and/or salts thereof as electrolytes. Examples of the carboxylic acid that can be used are acetic acid, butanoic acid, succinic acid, pimelic acid, malonic acid, benzoic acid, isophthalic acid, phthalic acid, terephthalic acid, maleic acid, toluic acid, enanthic acid, decanedicarboxylic acids such as 1,6-decanedicarboxylic acid and 5,6-decanedicarboxylic acid, octanedicarboxylic acid such as 1,7-octanedicarboxylic acid, and sebacic acid.

Examples of the carboxylic salts are an ammonium salt, quaternary ammonium salts such as tetraalkylammonium salts (e.g., tetramethylammonium salt, tetraethylammonium salt, tetrapropylammonium salt, tetrabutylammonium salt, methyltriethylammonium salt, dimethyldiethylammonium salt), pyridinium salts (e.g., 1-methylpyridinium salt, 1-ethylpyridinium salt, 1,3-diethylpyridiniuml salt), amine salts such as primary amines salts (methylamine salt, ethylamine salt, propylamine salt, butylamine salt, ethylenediamine salt, monoethanolamine salt), secondary amine salts (dimethylamine salt, diethylamine salt, dipropyl amine salt, ethylmethylamine salt, diphenylamine salt, diethanolamine salt), tertiary amine salts (trimethylamine salt, triethylamine salt, tributylamine salt, 1,8-diazabicyclo(5.4.0)-undecene-7 salt, triethanolamine salt), of the above carboxylic acids.

Moreover, a salt of an anionic component derived from phthalic acid, isophthalic acid, terephthalic acid, maleic acid, benzoic acid, toluic acid, enanthic acid, malonic acid or the like and a quaternary cyclic amidinium ion as a cationic component can also be used. The quaternary cyclic amidinium ion is a cation produced by quaternarizing a cyclic compound with an N,N,N'-substituted amidine group. Examples of the cyclic compound with an N,N,N'-substituted amidine group are imidazole monocyclic compounds (e.g., imidazole homologues such as 1-methylimidazole, 1-phenylimidazole, 1,2-dimethylimidazole, 1-ethyl-2-methylimidazole and 1,2,4-trimethyl imidazole, oxyalkyl derivatives such as 1-methyl-2-oxymethylimidazole and 1-methyl-2-oxyethylimidazole, nitro derivatives such as 1-methyl-4(5)-nitroimidazole, amino derivatives such as 1,2-dimethyl-5(4)-aminoimidazole), benzimidazole compounds (e.g., 1-methylbenzimidazole, 1-methyl-2-benzimidazole, 1-methyl-5(6)-nitrobenzimidazole), compounds with a 2-imidazoline ring (e.g., 1-methylimidazoline, 1,2-dimethylimidazoline, 1,2,4-trimethylimidazoline, 1-methyl-2-phenylimidazoline, 1-ethyl-2-methyl-imidazoline, 1,4-dimethyl-2-ethylimidazoline, 1-methyl-2-ethoxymethylimidazoline), and compounds with a tetrahydropyrimidine ring (e.g., 1-methyl-1,4,5,6-tetrahydropyrimidine, 1,2-dimethyl-1,4,5,6-tetrahydropyrimidine, 1,5-diazabicyclo [4,3,0]nonene-5).

The electrolytic solution for an aluminum electrolytic capacitor of the present invention further comprises the phosphorus oxoacid ion-generating compound which can generate a phosphorus oxoacid ion in an aqueous solution.

The phosphorus oxoacid ion-generating compound can be selected from phosphoric acid, phosphorous acid, hypophosphorous acid, phosphonic acid, phosphinic acid and salts thereof; esters of phosphoric acid and alkylphosphoric acid, esters and derivatives of phosphonic acid and diphosphonic acid, esters of phosphinic acid, and salts thereof; and condensation products thereof and salts of the condensation products.

First of all, phosphoric acid, phosphorous acid, hypophosphorous acid and salts thereof can be used as the phosphorus oxoacid ion-generating compounds. As the salts of phosphoric acid, phosphorous acid and hypophosphorous acid, an ammonium salt, an aluminum salt, a sodium salt, a calcium salt and a potassium salt can be exemplified. Phosphoric acid and the salt thereof decompose in the aqueous solution to form a phosphoric ion. Phosphorous acid, hypophosphorous acid, and salts thereof generate a phosphorous acid ion, a hypophosphorous acid ion, and isomers thereof, that is, a phosphonic acid ion and a phosphinic acid ion, and further generate a phosphoric acid ion through oxidation at the anode of the aluminum electrolytic capacitor.

Further, esters of phosphoric acid and alkylphosphoric acid such as ethyl phosphate, diethyl phosphate, butyl phosphate and dibutyl phosphate, phosphonic acid, diphosphonic acid, esters and derivatives of phosphonic acid and diphosphonic acid such as 1-hydroxyethylidene-1,1-diphosphonic acid, aminotrimethylenephosphonic acid and phenylphosphonic acid, phosphinic acid, esters of phosphinic acid such as methyl phosphinate, and butyl phosphinate; and salts thereof such as an ammonium salt, an aluminum salt, a sodium salt, a potassium salt and a calcium salt can be used as the phosphorus oxoacid ion-generating compounds. Among these compounds, dibutyl phosphate, 1-hydroxyethylidene-1,1-diphosphonic acid, and salts thereof are preferred.

Further, the condensed phosphoric acid which is condensation product of phosphoric acid and the salt thereof can be used as the phosphorus oxoacid ion-generating compound. Examples of the condensed phosphoric acid, linear condensed phosphoric acids such as pyrophosphoric acid, tripolyphosphoric acid and tetrapolyphosphoric acid, and cyclic condensed phosphoric acids such as metaphosphoric acid and hexametaphosphoric acid. The combined compound of the linear and cyclic condensed phosphoric acid can be also used. Examples of the salt of the condensed phosphoric acid are an ammonium salt, a sodium salt and a potassium salt. Among these compounds, pyrophosphoric acid, tripolyphosphoric acid tetraphosphoric acid and the salts thereof are preferred, pyrophosphoric acid, tripolyphosphoric acid and the salts thereof are more preferred, and triphosphoric acid is particularly preferred. Examples of the salt of the combined compound of the condensed phosphoric acid are an ammonium salt, an aluminum salt, a sodium salt, a potassium salt and a calcium salt.

Furthermore, the condensation product of the above-mentioned phosphorus oxoacid ion-generating compound and the salt thereof can be used. Examples of the salt of the condensation product are an ammonium salt, an aluminum salt, a sodium salt, a potassium salt and calcium salt.

The phosphorus oxoacid ion-generating compound generates a phosphoric acid ion in the aqueous solution or generate a phosphorous acid ion, a hypophosphorous acid ion, and the isomers thereof, that is, a phosphonic acid ion and a phosphinic acid ion, and further generates a phosphoric acid ion through oxidation at the anode of the aluminum electrolytic capacitor.

Among these compounds, phosphoric acid and the salts thereof, the condensed phosphoric acid and the derivatives of phosphoric acid such as esters of phosphoric acid and alkyl phosphoric acid are preferred, because these compounds easily generate the phosphoric acid ion. Additionally, phosphoric acid, the linear condensation products such as pyrophosphoric acid and tripolyphosphoric acid and the salts thereof are preferred, because these compounds generate a large amount of the phosphoric ions in a relatively high rate with respect to the added amount. The effect of the present invention can be obtained by using a compound other than the above-mentioned phosphorus oxoacid ion-generating compounds if it can generate a phosphorus oxoacid ion in an aqueous solution.

One kind of the phosphorus oxoacid ion-generating compounds can be used alone, but two or more kinds of the compounds can be used. The amount of the phosphorus oxoacid ion-generating compound is from 0.01 to 5.0% by weight, preferably from 0.2 to 3.0% by weight, based on the overall electrolytic solution. If the amount thereof is not within the range, the effect of the invention reduces.

The electrolytic solution for an aluminum electrolytic capacitor of the present invention further comprises the chelating agent which can coordinate with aluminum to form an aqueous aluminum chelate complex.

Examples of the chelating agent are α-hydroxy carboxylic acids such as citric acid, tartaric acid, gluconic acid, malic acid, lactic acid, glycolic acid, α-hydroxybutyric acid, hydroxymalonic acid, α-methylmalic acid and dihydroxytartaric acid, aromatic hydroxycarboxylic acids such as γ-resorcyclic acid, β-resorcyclic acid, trihydroxybenzoic acid, hydroxyphthalic acid, dihydroxyphthalic acid, phenoltricarboxylic acid, aluminon and Eriochrome Cyanine R, sulfocarboxylic acids such as sulfosalicylic acid, tannins such as tannic acid, guanidines such as dicyandiamide, saccharides such as galactose and glucose, lignins such as lignosulfonate, aminopolycarboxylic acids such as ethylenediaminetetraacetic acid (EDTA), nitrilotriacetic acid (NTA), glycoletherdiaminetetraacetic acid (GEDTA), diethylenetriaminepentaacetic acid (DTPA), hydroxyethylethylenediaminetriacetic acid (HEDTA) and triethylenetetraaminehexaacetic acid (TTHA), and salts thereof. As the salts thereof, an ammonium salt, an aluminum salt, a sodium salt and a potassium salt can be used.

Among them, tannic acid, trihydroxybenzoic acid, citric acid, tartaric acid, gluconic acid, aulin tricarboxylic acid, γ-resorcyclic acid, DTPA, EDTA, GEDTA, HEDTA, TTHA and salts thereof are preferred because they easily form a chelate complex with aluminum. Particularly preferable are tannic acid, trihydroxybenzoic acid, citric acid, tartaric acid, γ-resorcyclic acid, aulin tricarboxylic acid, DTPA, GEDTA, HEDTA, TTHA, and salts thereof.

One kind of the chelating agents can be used alone, but two or more kinds of the chelating agents can also be used. The added amount of the chelaing agent is from 0.01 to 3.0% by weight, preferably 0.1 to 2.0% by weight, based on the overall electrolytic solution. If the amount thereof is not within the range, the effect of the invention reduces.

The chelating agent and the phosphorus oxoacid ion-generating compound that are added when preparing the electrolytic solution are so added that the molar ratio of the chelating agent and the phosphorus oxoacid ion in the electrolytic solution is from 1:20 to 3:1, preferably 1:10 to 1:1. If the amount of the chelating agent is lower than the ratio, leakage current properties of the capacitor are lowered. If the amount of the chelaing agent is higher than the ratio, high-temperature life span properties of the capacitor deteriorate though the reasons therefor are not clear.

If an aluminum ion exists in the electrolytic solution, the combined product of a phosphorus oxoacid ion and an aqueous aluminum chelate complex is formed in the electrolytic solution by reaction of the chelating agent, a phosphorus oxoacid ion generated by the phosphorus oxoacid ion-generating compound, and the aluminum ion. It is possible to introduce into the capacitor the electrolytic solution having the combined product of a phosphorus oxoacid ion and an aqueous aluminum chelate complex which is previously formed by adding an aluminum salt or the like to the electrolytic solution. However, if the electrolytic solution which includes the phosphorus oxoacid ion-generating compound and the chelating agent but does not include an aluminum ion is introduced into the aluminum electrolytic capacitor, the aluminum ion is eluted from the electrode foil, and therefore, the electrolytic solution in the capacitor includes the combined product of a phosphorus oxoacid ion and an aqueous aluminum chelate complex. This combined product maintains chemical equilibrium with the phosphorus oxoacid ions in the electrolytic solution in the state that it is dissolved into the electrolytic solution or attached to the electrode foil, and keeps the adequate amount of the phosphorus oxoacid ions in the electrolytic solution. As a result, the phosphorus oxoacid ions in the electrolytic solution and the phosphorus oxoacid ions in the combined products are detected for a long period after leaving the capacitor untreated. The storage characteristics of the capacitor improves, because the adequate amount of the phosphorus oxoacid ions in the electrolytic solution inhibits the dissolution of aluminum in the anode and the cathode, the formation of the hydroxides of aluminum and other reaction products, and the generation of hydrogen gas. In the electrolytic solution of the present invention, the dissolution of aluminum in the anode and the cathode, the formation of the hydroxides and other reaction products, and the generation of hydrogen gas are surprisingly inhibited by the synergetic effect of the combined product and azelaic acid and/or the salt thereof.

The electrolytic solution of the present invention can contain other components in addition to the above-mentioned compounds.

For example, as the electrolyte other than the carboxylic acid and the carboxylic salt, boric acid, a polyalcohol complex of boric acid formed from boric acid and a polyalcohol, carbonic acid, silicic acid and other inorganic acids can be contained, and mannite, a nonionic surfactant, colloidal silica or the like can be added to the electrolytic solution for the purpose of improving dielectric withstanding voltage.

Furthermore, nitro compounds such as p-nitrophenol, m-nitrophenol, o-nitrophenol, p-nitrobenzoic acid, m-nitrobenzoic acid, o-nitrobenzoic acid, p-nitroanisole, m-nitroanisole and o-nitroanisole can be contained to absorb hydrogen that is rapidly formed especially at a high temperature.

The electrolytic solution for an aluminum electrolytic capacitor of the present invention can be prepared by solving into the solvent containing water the compound selected from the group consisting of azelaic acid and an azelaic acid salt, the compound selected from the group consisting of formic acid, a formic acid salt, adipic acid, an adipic acid salt, glutaric acid and a glutaric acid salt, the phosphorus oxoacid ion-generating compound, and the chelating agent as well as other additives as necessary. It is possible that azelaic acid and at least one of formic acid, adipic acid and glutaric acid as the electrolytes is added to the solvent, and the pH value is adjusted by disacidifying with, for example, ammonia gas or amines such as dimethylamine and diethylamine. It is preferable to adjust the pH value within 5.7 to 6.3. If the pH value is lower than 5.7 or higher than 6.3, the deterioration of the anode and the cathode sometimes proceeds.

The above-mentioned electrolytic solution for an aluminum electrolytic capacitor of the present invention is preferably used in an aluminum electrolytic capacitor with an anode, an cathode, and a separator holding an electrolytic solution located between the anode and the cathode.

High-grade aluminum foil for an anode or a cathode is subjected to chemical or electrochemical etching in order to increase the surface areas thereof, and then an aluminum oxide film is formed by formation treatment on the surface of the anode. Then the aluminum foil for a cathode is subjected to a formation treatment with a forming solution such as an aqueous solution of ammonium borate, an aqueous solution of ammonium adipate and an aqueous solution of ammonium phosphate in order to form an aluminum oxide film on the surface.

A capacitor element is formed by placing a separator made by manila hemp, craft paper or the like between the anode and the cathode obtained in the above-mentioned manner. The aluminum electrolytic capacitor is prepared by impregnating the electrolytic solution for an aluminum electrolytic capacitor of the present invention into the capacitor element and then accommodating the capacitor element having the electrolytic solution into a sealing package.

It is found that the dissolution of aluminum in the electrodes is inhibited if phosphorous is included in the aluminum oxide film of the anode. Introduction of phosphorous into the aluminum oxide film of the anode can be executed by any method as far as the introduction thereof is possible, but it is preferable to be executed by a formation treatment of the anode in an aqueous solution containing a compound selected from phosphoric acid or a salt thereof such as an ammonium salt, an aluminum salt, a sodium salt, a potassium salt and a calcium salt. The aqueous solution for the formation treatment can contain one or more compounds selected from phosphoric acid and the salts thereof. The aqueous solution having phosphoric acid and ammonium phosphate can be preferably used. Further, phosphorus can be introduced in the aluminum oxide film by a formation treatment of the anode in an aqueous solution that does not contain phosphorous such as an aqueous solution of ammonium borate and an aqueous solution of ammonium adipate, followed by the formation treatment of the anode in the aqueous solution containing one or more compounds selected from phosphoric acid or the salts thereof. By these formation treatment processes, phosphorus is existed near the surface of the aluminum oxide film in high concentration. Additionally, phosphorus can be introduced in the aluminum oxide film by immersing the anode with the aluminum oxide film formed by the formation treatment in the aqueous solution that does not contain phosphorous such as an aqueous solution of ammonium borate and an aqueous solution of ammonium adipate into the forming solution containing one or more compounds selected from phosphoric acid or the salts thereof, and extracting the anode from the forming solution, and then let the anode dry naturally or giving the anode an oxidation treatment by heating.

Especially, the simultaneous use of an anode for an aluminum electrolytic capacitor which contains phosphorus in an amount of 30 mg or more per CV unit in terms of phosphoric acid and an electrolytic solution comprising the combined product of an aqueous aluminum chelate complex and a phosphorus oxoacid ion surprisingly leads to the inhibition of the dissolution of aluminum in the anode and the cathode, the formation of the hydroxides of aluminum and other reaction products, and the generation of hydrogen gas, by a synergetic effect of the combined product and the above-mentioned anode, even if the increased amounts of water and a carboxylic acid and/or a carboxylic salt as electrolytes are included in the electrolytic solution. This advantageous effect is obtained whether or not the electrolytic solution contains azelaic acid or the azelaic acid salt as an electrolyte. As a result, the aluminum electrolytic capacitor having low impedance properties and a longer service life, especially the capacitor having a longer service life in a life-span test at a high temperature, can be obtained.

Therefore, the present invention further provides an aluminum electrolytic capacitor comprising an anode constructed from aluminum foil with an aluminum oxide film on the surface, a cathode constructed from aluminum foil, and a separator holding an electrolytic solution located between the anode and the cathode, wherein the anode comprises phosphorus in an amount of 30 to 150 mg per unit CV product in terms of phosphoric acid in the aluminum oxide film, and the electrolytic solution comprises a solvent containing water, an electrolyte selected from the group consisting of a carboxylic acid and a carboxylic salt, and a combined product of a phosphorus oxoacid ion and an aqueous aluminum chelate complex.

Figure 2:
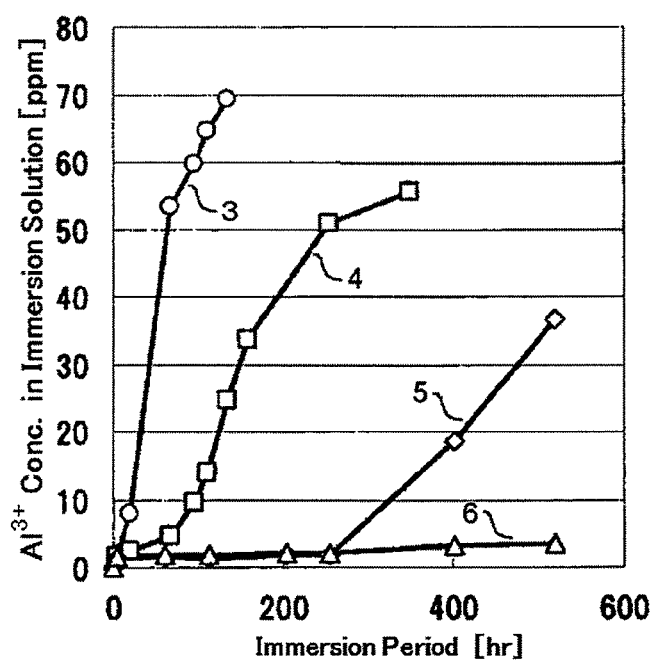
FIG. 2 shows a result of research on dissolution of aluminum from the electrode of which the content of phosphorous in an aluminum oxide film is changed.

FIG. 2 shows the result of immersing the electrode of which the content of phosphorous in an aluminum oxide film is changed into a solution obtained by dissolving 6 g of formic acid in 100 g of water and neutralizing it with ammonia water, and measuring the amount of aluminum ions dissolved from the electrode by the inductively coupled plasma atomic emission spectroscopy. In FIG. 2, the line 3 shows the result when an electrode without any phosphorus in the aluminum oxide film is used, the line 4 shows the result when the electrode of which the amount of phosphorus in the aluminum oxide film is 30 mg/CV in terms of phosphoric acid is used, the line 5 shows the result when the electrode of which the amount of phosphorus in the aluminum oxide film is 60 mg/CV in terms of phosphoric acid is used, and the line 6 shows the result when the electrode of which the amount of phosphorus in the aluminum oxide film is 100 mg/CV in terms of phosphoric acid is used, respectively. As known from FIG. 2, the amount of aluminum dissolved significantly decreases as the content of phosphorus increases in the aluminum oxide film, even if formic acid exists in the solution. Therefore, it is concluded that the aluminum oxide layer containing phosphorus serves as a protection layer.

The amount of phosphorous in the aluminum oxide film is from 30 to 150 mg, preferably from 50 to 120 mg, and particularly 80 to 120 mg, per unit CV product in terms of phosphoric acid. If it is less than 30 mg per unit CV product, the effect as a protection layer of the aluminum oxide film is not sufficient. If it is more than 150 mg per unit CV product, it is economically disadvantageous because the effect of the present invention is saturated, and the capacitance of the capacitor adversely decreases. The preferred content of phosphorus in the aluminum oxide film that gives the sufficient effect to the protection layer of the aluminum oxide film and does not lower the capacitance of the capacitor is from 50 to 70 mg per unit CV product in terms phosphoric acid.

In the aluminum electrolytic capacitor of the present invention having the anode containing 30 mg or more of phosphorus per unit CV product in terms of phosphoric acid in the aluminum oxide film, the electrolytic solution used can contain, as the solvent, water alone. However, a mixed solvent of water and an organic solvent is preferable. For the organic solvent, all the organic solvents shown above as to the electrolytic solution for an aluminum electrolytic capacitor of the present invention can be used. One kind of the organic solvents can be used alone, but two or more kinds of the solvents can be used. Use of ethylene glycol is particularly preferable. The water content in the electrolytic solution is preferably from 20 to 80% by weight, more preferably from 35 to 70% by weight, and particularly from 45 to 65% by weight, based on the overall electrolytic solution. If the water content is less than 20% by weight, the specific resistance of the electrolytic solution becomes too large at a low temperature. If the content of water is more than 80% by weight, a freezing point of the electrolytic solution becomes higher and the warranty scope of the capacitor becomes too narrow.

In the aluminum electrolytic capacitor of the present invention having the anode containing phosphorus in an amount of 30 mg or more per unit CV product in terms of phosphoric acid in the aluminum oxide film, the electrolytic solution used comprises a compound selected from a carboxylic acid and a salt thereof as the electrolyte. For the carboxylic acid and/or the carboxylic salt, all of the carboxylic acids and/or salts thereof shown for the above-mentioned electrolytic solution for an aluminum electrolytic capacitor of the present invention can be used. One kind of the compounds can be used alone, but two or more kinds of the compounds can be used. The total amount of the carboxylic acid and/or the carboxylic salt is generally from 5 to 25% by weight, preferably from 9 to 20% by weight, based on the overall electrolytic solution. If it is less than 5% by weight, a specific resistance of the electrolytic solution does not decrease sufficiently. If it is more than 25% by weight, the carboxylic acid or the carboxylic salt sometimes precipitates at a low temperature.

Especially, formic acid, adipic acid, glutaric acid, and salts thereof such as an ammonium salt, a dimethylamine salt and a diethyl amine salt are preferred because these compounds effectively lower the specific resistance of the electrolytic solution. By using these electrolytes, especially using formic acid and/or the salt thereof, the electrolytic solution with the specific resistance of 30 Ωcm or less at a 30° C. can be obtained. Even if the electrolytic solution having the low specific resistance is used, the dissolution of aluminum in the anode and the cathode, the formation of the hydroxides of aluminum and other reaction products, and the generation of hydrogen gas are inhibited with the synergetic effect of the combined product of a phosphorus oxoacid ion and an aqueous aluminum chelate complex and the anode with the aluminum oxide film containing the adequate amount of phosphorus. As a result, the aluminum electrolytic capacitor with low impedance properties as well as a longer service life can be preferably obtained. Particularly, azelaic acid and/or the azelaic acid salt are preferable electrolytes because they inhibit the dissolution of aluminum from the anode and the cathode as mentioned above.

In the aluminum electrolytic capacitor of the present invention having the anode containing phosphorus in an amount of 30 mg or more per unit CV product in terms of phosphoric acid in the aluminum oxide film, the electrolyte used further comprises the combined product of a phosphorus oxoacid ion and an aqueous aluminum chelate complex. This combined product can be formed in the electrolytic solution by adding an aluminum ion, a phosphorus oxoacid ion-generating compound which can generate a phosphorus oxoacid ion in an aqueous solution, and a chelating agent which can coordinate to aluminum to form an aqueous aluminum chelate complex. The aluminum ion can be added to the electrolytic solution beforehand, but use of the aluminum ion eluded from the anode and the cathode is preferable.

For the phosphorus oxoacid ion-generating compound and the chelating agent, all of the phosphorus oxoacid ion-generating compounds and the chelating agents shown for the above-mentioned electrolytic solution for an aluminum electrolytic capacitor of the present invention described above can be used, and the preferred phosphorus oxoacid ion-generating compounds and the preferred chelating agent shown for the electrolytic solution for an aluminum electrolytic capacitor of the present invention described above are also preferable in this case. One kind of the phosphorus oxoacid ion-generating compounds can be used alone, but two or more kinds of the phosphorus oxoacid ion-generating compounds can be used. Similarly, one kind of the chelating agents can be used alone, but two or more kinds of the chelating agents can be used. The added amount of the phosphorus oxoacid ion-generating compound is from 0.01 to 5.0% by weight, preferably from 0.2 to 3.0% by weight, based on the overall electrolytic solution. The added amount of the chelating agent is from 0.01 to 3.0% by weight, preferably from 0.1 to 2.0% by weight, based on the overall electrolytic solution. The phosphorus oxoacid ion-generating compound and the chelating agent are so added that the molar ratio of the chelating agent and the phosphorus oxoacid ion is from 1:20 to 3:1, preferably from 1:10 to 1:1.

When the electrolytic solution of an aluminum electrolytic capacitor of the present invention comprising a solvent of water, the adequate amount of azelaic acid and/or the azelaic acid salt, a compound selected from the group consisting of formic acid, a formic acid salt, adipic acid, an adipic acid salt, glutaric acid and a glutaric acid salt, and a combined product of a phosphorus oxoacid ion and an aqueous aluminum chelate complex, is used as the electrolytic solution for the aluminum electrolytic capacitor having the anode containing phosphorus in an amount of 30 to 150 mg per unit CV product in terms of phosphoric acid in the aluminum oxide film, the specific resistance of the electrolytic solution can be lowered effectively by the compound selected from the group consisting of formic acid, a formic acid salt, adipic acid, an adipic acid salt, glutaric acid and a glutaric acid salt. For example, the combination of formic acid and/or the formic acid salt in an amount of 0.5 to 3.0 moles per kg of the solvent and the compound selected from adipic acid, an adipic acid salt, glutaric acid and a glutaric acid salt in an amount of 0 to 1.5 moles per kg of the solvent can lower the specific resistance of the electrolytic solution to approximately 10 to 30 Ωcm at 30° C. Moreover, by the joint effect come from azelaic acid and/or the azelaic acid salt, the combined product of a phosphorus oxoacid ion and an aqueous aluminum chelate complex, and the anode from which aluminum is hard to be dissolved, the service life of the capacitor, especially the service life in a high-temperature life test, is remarkably protracted, and the particularly preferred aluminum electrolytic capacitor that does not result in valve opening after 6,000 hours is elapsed in a non-load life test at 105° C.

EXAMPLES

The followings are examples of the present invention, though the present invention is not limited to the following examples.

Preparation of Anodes

Anode A

Strip-shaped aluminum foil with the purity of 99.9% was subjected to a surface enlargement treatment by etching, and then subjected to a formation treatment for 30 minutes under the condition of 13 volt formation voltage in an aqueous solution of ammonium dihydrogen phosphate (concentration: 2.8 g/L, pH: 4.5-7.0) to form an aluminum oxide film containing phosphorus on the surface thereof. For the anode with the aluminum oxide film thus obtained, a capacitance (C) of aluminum oxide dielectrics in the anode foil was measured, and then a film withstand voltage (V) was measured by a volt-time curve. Then, the anode foil was completely dissolved in hydrochloric acid, and the quantity of phosphoric acid in the hydrochloric acid solution was determined by the molybdenum blue method. The amount of phosphoric acid obtained was divided by the product of the capacitance (C) and the film withstand voltage (V) to calculate the amount of phosphoric acid per unit CV product. The amount of phosphorus was 150 mg per unit CV product in terms of phosphoric acid.

Anode B

Aluminum foil subjected to the surface enlargement treatment by the same manner as the anode A was subjected to a formation treatment for 30 minutes under the condition of 13 volt formation voltage in an aqueous solution of ammonium dihydrogen phosphate (concentration: 1.4 g/L, pH: 4.5-7.0) to form an aluminum oxide film containing phosphorus on the surface thereof. For the anode with the aluminum oxide film obtained, the amount of phosphorus per unit CV product in the aluminum oxide film was determined by the above-mentioned method, and the amount of phosphorus was 120 mg per unit CV product in terms of phosphoric acid.

Anode C

Aluminum foil subjected to the surface enlargement treatment by the same manner as the anode A was subjected to the first formation treatment for 30 minutes under the condition of 3 volt formation voltage in an aqueous solution of ammonium adipate (concentration: 150 g/L, pH: 4.5-7.0), followed by the second formation treatment for 30 minutes under the condition of 13 volt formation voltage in an aqueous solution of ammonium dihydrogen phosphate (concentration: 1.4 g/L, pH: 4.5-7.0) to form an aluminum oxide film containing phosphorus on the surface thereof. For the anode with the aluminum oxide film obtained, the amount of phosphorus per unit CV product in the aluminum oxide film was determined by the above-mentioned method, and the amount of phosphorus was 100 mg per unit CV product in terms of phosphoric acid.

Anode D

Aluminum foil subjected to the surface enlargement treatment by the same manner as the anode A was subjected to the first formation treatment for 30 minutes under the condition of 10 volt formation voltage in an aqueous solution of ammonium adipate (concentration: 150 g/L, pH: 4.5-7.0), followed by the second formation treatment for 30 minutes under the condition of 13 volt formation voltage and controlled formation current in an aqueous solution of ammonium dihydrogen phosphate (concentration: 1.4 g/L, pH: 4.5-7.0) to form an aluminum oxide film containing phosphorus on the surface thereof. For the anode with the aluminum oxide film obtained, the amount of phosphorus per unit CV product in the aluminum oxide film was determined by the above-mentioned method, and the amount of phosphorus was 70 mg per unit CV product in terms of phosphoric acid.

Anode E

Aluminum foil subjected to the surface enlargement treatment by the same manner as the anode A was subjected to the first formation treatment for 30 minutes under the condition of 10 volt formation voltage in an aqueous solution of ammonium adipate (concentration: 150 g/L, pH: 4.5-7.0), followed by the second formation treatment for 30 minutes under the condition of 13 volt formation voltage and controlled formation current in an aqueous solution of ammonium dihydrogen phosphate (concentration: 1.4 g/L, pH: 4.5-7.0) to form an aluminum oxide film containing phosphorus on the surface thereof. For the anode with the aluminum oxide film obtained, the amount of phosphorus per unit CV product in the aluminum oxide film was determined by the above-mentioned method, and the amount of phosphorus was 60 mg per unit CV product in terms of phosphoric acid.

Anode F

Aluminum foil subjected to the surface enlargement treatment by the same manner as the anode A was subjected to the first formation treatment for 30 minutes under the condition of 10 volt formation voltage in an aqueous solution of ammonium adipate (concentration: 150 g/L, pH: 4.5-7.0) followed by the second formation treatment for 30 minutes under the condition of 13 volt formation voltage and controlled formation current in an aqueous solution of ammonium dihydrogen phosphate (concentration: 1.4 g/L, pH: 4.5-7.0) to form an aluminum oxide film containing phosphorus on the surface thereof. For the anode with the aluminum oxide film obtained, the amount of phosphorus per unit CV product in the aluminum oxide film was determined by the above-mentioned method, and the amount of phosphorus was 50 mg per unit CV product in terms of phosphoric acid.

Anode G

Aluminum foil subjected to the surface enlargement treatment by the same manner as the anode A was subjected to the first formation treatment for 30 minutes under the condition of 13 volt formation voltage in an aqueous solution of ammonium adipate (concentration: 150 g/L, pH: 4.5-7.0). Then, the aluminum foil was immersed into the aqueous solution of ammonium dihydrogen phosphate (concentration: 1.4 g/L, pH value: 4.5-7.0) in order to be executed reforming under the condition of 13 volt formation voltage. After reforming, the foil was pulled out and was given a heat treatment in air for 1 minute at 500° C. in an electric furnace. For the anode with the aluminum oxide film obtained, the amount of phosphorus per unit CV product in the aluminum oxide film was determined by the above-mentioned method, and the amount of phosphorus was 30 mg per unit CV product in terms of phosphoric acid.

Anode H

Aluminum foil subjected to the surface enlargement treatment by the same manner as the anode A was subjected to a formation treatment for 30 minutes under the condition of 13 volt formation voltage in an aqueous solution of ammonium adipate (concentration: 150 g/L, pH: 4.5-7.0) to form an aluminum oxide film without phosphorus on the surface thereof.

Preparation of Aluminum Electrolytic Capacitor

Strip-shaped aluminum foil with the purity of 99.9% was subject to a surface enlargement treatment by etching to form a cathode. The cathode and any one of the anodes A to H were overlapped via a separator made by Manila hemp, and were wound up. They were impregnated with any one of electrolytic solutions shown in the following Tables 1 to 7 and inserted into an aluminum sealing package having a closed-end cylindrical form. A butyl-rubber sealing member was inserted at the open-end of the outer sealing package, and then the electrolytic capacitor was sealed by drawing the open-end of the outer sealing package. Aluminum electrolytic capacitors with radius 10 mm, height 20 mm, rating 6.3V, 2200 µF were prepared by the above process. The electrolytic solution was neutralized by ammonia gas or addition of amine to adjust the pH value in the range of 5.7 to 6.3. Because the electrolytic solution was neutralized by ammonia or amine, it is the same as a carboxylic salt is dissolved as the electrolyte in the solvent. However, Tables below describe the electrolyte in the form of acid, not a salt, and the molar quantity of the electrolyte per kg of the solvent is also described as molar quantity of formic acid per kg of the solvent, molar quantity of adipic acid or glutaric acid per kg of the solvent, and molar quantity of azelaic acid per kg of the solvent. Every amount of azelaic acid shown in Tables 1 to 7 was the saturated amount of dissolution or less at 50° C. in each electrolytic solution.

Property Evaluation of Aluminum Electrolytic Capacitor

A capacitance, a leakage current, and a dielectric loss of a fresh capacitor thus obtained were evaluated. After 4,000 hours or 6,000 hours elapsed in a non-load test at 105° C., a dielectric loss was evaluated again. For a capacitor that resulted in valve opening before 4,000 hours elapsed in the non-load test at 105° C., the time elapsed to the valve opening was recorded as its service life. The service life of a capacitor tends to be shorter as the change ratio of dielectric losses before and after the non-load test at 105° C. is bigger. It has also been found that, if the change ratio of dielectric losses exceeds 200%, a capacitor will thereafter result in the valve opening at an early stage.

(1) Influence of Concentration of Azelaic Acid in Electrolytic Solution

The aluminum electrolytic capacitors were prepared using the anodes G and H, and the electrolytic solutions with different content of azelaic acid, and property evaluation was given to them. Table 1 below shows in a summary form the composition of the electrolytic solution used in each capacitor, molar quantity of azelaic acid per kg of the solvent, molar quantity of formic acid per kg of the solvent, molar quantity of adipic acid per kg of the solvent, the specific resistance of the electrolytic solution at 30° C., the capacitance, the leakage current and the dielectric loss (tan δ) of the fresh capacitor, the dielectric loss after 4,000 hours elapsed at the non-load test at 105° C., the change ratio of dielectric losses before and after 4,000 hours elapsed, and the time elapsed to the valve opening if the capacitor resulted in the valve opening.

TABLE 1

| | Anode phosphorus (mg/CV) | composition (parts per weight) | azelaic acid (mol/kg) | formic acid (mol/kg) | adipic acid (mol/kg) | specific resistance (Ω cm) | capacitance (μF) | leakage current (μA) | tan δ fresh | tan δ after 4000 hr (change ratio) |
|---|---|---|---|---|---|---|---|---|---|---|
| Example 1 | Anode: G Phosphorus: 30 | water 60 ethylene grycol 17 adipic acid 4.5 formic acid 6.0 azelaic acid 7.0 diethylenetriaminepentaacetic acid 1 diammonium hydrogen phosphate 1 p-nitrophenol 1 p-nitrobenzoic acid 0.2 | 0.484 | 1.69 | 0.40 | 13 | 2200 | 3.9 | 0.045 | 0.055 (122%) |
| Example 2 | Anode: G Phosphorus: 30 | water 60 ethylene grycol 19 adipic acid 4.5 formic acid 6.0 azelaic acid 4.5 diethylenetriaminepentaacetic acid 1 diammonium hydrogen phosphate 1 p-nitrophenol 1 p-nitrobenzoic acid 0.2 | 0.303 | 1.65 | 0.39 | 13 | 2280 | 4.0 | 0.045 | 0.055 (122%) |
| Example 3 | Anode: G Phosphorus: 30 | water 60 ethylene grycol 21 adipic acid 4.5 formic acid 6.0 azelaic acid 3.0 diethylenetriaminepentaacetic acid 1 diammonium hydrogen phosphate 1 p-nitrophenol 1 p-nitrobenzoic acid 0.2 | 0.197 | 1.61 | 0.38 | 13 | 2220 | 3.2 | 0.045 | 0.060 (133%) |
| Example 4 | Anode: G Phosphorus: 30 | water 60 ethylene grycol 23 adipic acid 4.5 formic acid 6.0 azelaic acid 1.0 diethylenetriaminepentaacetic acid 1 diammonium hydrogen phosphate 1 p-nitrophenol 1 p-nitrobenzoic acid 0.2 | 0.064 | 1.57 | 0.37 | 13 | 2240 | 4.2 | 0.045 | 0.076 (169%) |
| Example 5 | Anode: G Phosphorus: 30 | water 60 ethylene grycol 23 adipic acid 4.5 formic acid 6.0 azelaic acid 0.5 diethylenetriaminepentaacetic acid 1 diammonium hydrogen phosphate 1 p-nitrophenol 1 p-nitrobenzoic acid 0.2 | 0.032 | 1.57 | 0.37 | 13 | 2250 | 4.2 | 0.046 | 0.091 (198%) |
| Example 6 | Anode: H Phosphorus: 0 | water 60 ethylene grycol 21 adipic acid 4.5 formic acid 6.0 azelaic acid 3.0 diethylenetriaminepentaacetic acid 1 diammonium hydrogen phosphate 1 p-nitrophenol 1 p-nitrobenzoic acid 0.2 | 0.197 | 1.61 | 0.38 | 13 | 2190 | 3.5 | 0.045 | 0.063 (140%) |
| Example 7 | Anode: H Phosphorus: 0 | water 50 ethylene grycol 35 adipic acid 8.0 formic acid 2.0 azelaic acid 0.5 diethylenetriaminepentaacetic acid 1 | 0.031 | 0.51 | 0.64 | 29 | 2300 | 3.7 | 0.059 | 0.116 (196%) |

TABLE 1-continued

| | Anode phosphorus (mg/CV) | composition (parts per weight) | azelaic acid (mol/kg) | formic acid (mol/kg) | adipic acid (mol/kg) | specific resistance (Ω cm) | capaci- tance (μF) | leakage current (μA) | tan δ fresh | tan δ after 4000 hr (change ratio) |
|---|---|---|---|---|---|---|---|---|---|---|
| Example 8 | Anode: H Phosphorus: 0 | diammonium hydrogen phosphate 1 p-nitrophenol 1 water 50 ethylene grycol 31 adipic acid 12.0 azelaic acid 7.0 diethylenetriaminepentaacetic acid 1 diammonium hydrogen phosphate 1 p-nitrophenol 1 p-nitrobenzoic acid 0.2 | 0.460 | 0 | 1.01 | 30 | 2330 | 4.9 | 0.065 | 0.124 (190%) |
| Comparative Example 1 | Anode: G Phosphorus: 30 | water 60 ethylene grycol 24 adipic acid 4.5 formic acid 6.0 azelaic acid 0.2 diethylenetriaminepentaacetic acid 1 diammonium hydrogen phosphate 1 p-nitrophenol 1 p-nitrobenzoic acid 0.2 | 0.013 | 1.55 | 0.37 | 13 | 2290 | 4.6 | 0.047 | Valve Opened After 3500 hr (−) |
| Comparative Example 2 | Anode: H Phosphorus: 0 | water 50 ethylene grycol 32 adipic acid 12.0 diethylenetriaminepentaacetic acid 1 diammonium hydrogen phosphate 1 p-nitrophenol 1 p-nitrobenzoic acid 0.2 | 0 | 0 | 1.00 | 30 | 2320 | 5.5 | 0.064 | Valve Opened After 2500 hr (−) |
| Comparative Example 3 | Anode: H Phosphorus: 0 | water 50 ethylene grycol 32 adipic acid 12.0 azelaic acid 7.0 diammonium hydrogen phosphate 1 p-nitrophenol 1 p-nitrobenzoic acid 0.2 | 0.454 | 0 | 1.00 | 30 | 2320 | 5.5 | 0.064 | Valve Opened After 100 hr (−) |

The electrolytic solution used in Examples 1 to 6 and Comparative Example 1 containing water in an amount of approximately 60% by weight of the entire electrolytic solution, formic acid of approximately 1.6 moles per kg of the solvent, and adipic acid of approximately 0.4 moles per kg of the solvent, showed the extremely low specific resistance of 13 Ωcm at 30° C. The electrolytic solution used in Example 7 containing water in an amount of approximately 50% by weight of the entire electrolytic solution and formic acid of 0.5 moles per kg of the solvent as well as the electrolytic solution used in Example 8 and Comparative Examples 2 and 3 containing water in an amount of approximately 50% by weight of the entire electrolytic solution and adipic acid of approximately 1.0 moles per kg of the solvent but not containing formic acid also showed the low specific resistance of 30 Ωcm or less at 30° C. Therefore, it can be concluded that, in order to obtain an electrolytic solution with the specific resistance of 30 Ωcm or less at 30° C., water of 50% or more by weight of the electrolytic solution should be contained, and further, formic acid of 0.5 moles or more per kg of the solvent, or adipic acid of 1.0 mole or more per kg of the solvent in the absence of formic acid should be contained in the electrolytic solution. The capacitances and the leakage currents of the aluminum electrolytic capacitors obtained were excellent in all Examples and comparative examples shown in the Table 1.

The capacitors in Comparative Examples 1 and 2, that used the electrolytic solutions with the concentration of azelaic acid in 0.03 moles or less per kg of the solvent, resulted in the opening of the safety valve before 4,000 hours elapsed in the non-load test at 105° C. On the other hand, as known from Examples 1 to 6, as the concentration of azelaic acid in the electrolytic solution became higher, the change ratio of dielectric losses before and after 4,000 hours elapsed in the non-load test at 105° C. became smaller and the service life of the capacitors prolonged. However, as known from the comparison of Examples 1 to 3, as the concentration of azelaic acid became higher, the effect to inhibit the change of the dielectric loss became no longer proportional to the concentration of azelaic acid, and the change of dielectric loss was almost equivalent in the range of azelaic acid in an amount of 0.3 moles or more per kg of the solvent.

In Example 7, the electrolytic solution used had lower contents of formic acid and water than those used in Examples 1 to 6 and did not have p-nitrobenzoic acid, and the capacitor had the anode without phosphorus in the aluminum oxide film. The specific resistance of the electrolytic solution was 29 Ωcm at 30° C. because the content of formic acid and water in the electrolytic solution was low, but it did not conduce to the valve opening after 4,000 hours elapsed in the non-load test at 105° C., and the capacitor with the long service life was obtained, though the electrolytic solution had azelaic acid in an amount of approximately as little as 0.03 moles per kg of the solvent.

In Comparative Example 3 in which the combined product of a phosphoric ion and an aluminum chelate complex (hereinafter referred as "the combined product") was not contained though azelaic acid of 0.45 moles per kg of the solvent and the phosphoric ion was contained in the electrolytic solution, the valve opened after only 100 hours elapsed in the non-load test at 105° C. In Comparative Example 2 in which azelaic acid did not exist though the combined product existed in the electrolytic solution, the valve opened after only 2,500 hours elapsed in the non-load test at 105° C. On the other hand, in Example 8 in which azelaic acid of 0.45 moles per kg of the solvent and the combined product was also contained in the electrolytic solution, the valve did not result in opening after 4,000 hours elapsed in the non-load test at 105° C., and the change ratio of dielectric losses was 190% (the valve opened after 4,500 hours). The service life of the aluminum electrolytic capacitor in Example 8 exceeds what can be expected from the combination of Comparative Examples 2 and 3, and the service life of the capacitor was found to be remarkably prolonged by the synergetic effect of the combined product and azelaic acid in the electrolytic solution. Further, it has been found from Table 1 that the aluminum electrolytic capacitor can be obtained that does not lead to the valve opening after 4,000 hours elapsed in the non-load test at 105° C. by using the electrolytic solution of the present invention with its specific resistance of 30 Ωcm or less at 30° C.

(2) Influence of Phosphorus Concentration in Aluminum Oxide Film of Anode

The aluminum electrolytic capacitors were prepared by using the anodes A to H and using the electrolytic solutions without azelaic acid, and property evaluation was given to them. Table 2 below shows in a summary form the composition of the electrolytic solution used in each capacitor, the specific resistance of the electrolytic solution at 30° C., the capacitance, the leakage current and the dielectric loss (tan δ) of the fresh capacitor, the dielectric loss after 4,000 hours elapsed at the non-load test at 105° C., the change ratio of dielectric losses before and after 4,000 hours elapsed, and, the time elapsed to the valve opening if the capacitor resulted in the valve opening.

TABLE 2

| | Anode phosphorus (mg/CV) | composition (parts per weight) | azelaic acid (mol/kg) | formic acid (mol/kg) | adipic acid (mol/kg) | specific resistance (Ω cm) | capacitance (μF) | leakage current (μA) | tan δ fresh | tan δ after 4000 hr (change ratio) |
|---|---|---|---|---|---|---|---|---|---|---|
| Example 9 | Anode: A Phosphorus: 150 | water 60 ethylene grycol 20 adipic acid 8.0 formic acid 6.0 diethylenetriaminepentaacetic acid 1 diammonium hydrogen phosphate 1 p-nitrophenol 1 p-nitrobenzoic acid 0.2 | 0 | 1.63 | 0.68 | 11 | 1930 | 3.7 | 0.041 | 0.047 (115%) |
| Example 10 | Anode: B Phosphorus: 120 | water 60 ethylene grycol 20 adipic acid 8.0 formic acid 6.0 diethylenetriaminepentaacetic acid 1 diammonium hydrogen phosphate 1 p-nitrophenol 1 p-nitrobenzoic acid 0.2 | 0 | 1.63 | 0.68 | 10 | 2150 | 3.5 | 0.041 | 0.045 (110%) |
| Example 11 | Anode: C Phosphorus: 100 | water 60 ethylene grycol 20 adipic acid 8.0 formic acid 6.0 diethylenetriaminepentaacetic acid 1 diammonium hydrogen phosphate 1 p-nitrophenol 1 p-nitrobenzoic acid 0.2 | 0 | 1.63 | 0.68 | 11 | 2160 | 3.9 | 0.041 | 0.049 (120%) |
| Example 12 | Anode: D Phosphorus: 70 | water 60 ethylene grycol 20 adipic acid 8.0 formic acid 6.0 diethylenetriaminepentaacetic acid 1 diammonium hydrogen phosphate 1 p-nitrophenol 1 p-nitrobenzoic acid 0.2 | 0 | 1.63 | 0.68 | 11 | 2250 | 4.1 | 0.041 | 0.070 (170%) |
| Example 13 | Anode: E Phosphorus: 60 | water 60 ethylene grycol 20 adipic acid 8.0 formic acid 6.0 diethylenetriaminepentaacetic acid 1 diammonium hydrogen phosphate 1 p-nitrophenol 1 p-nitrobenzoic acid 0.2 | 0 | 1.63 | 0.68 | 10 | 2300 | 3.8 | 0.041 | 0.070 (171%) |
| Example 14 | Anode: F Phosphorus: 50 | water 60 ethylene grycol 20 adipic acid 8.0 formic acid 6.0 diethylenetriaminepentaacetic acid 1 diammonium hydrogen phosphate 1 p-nitrophenol 1 p-nitrobenzoic acid 0.2 | 0 | 1.63 | 0.68 | 11 | 2250 | 4.1 | 0.041 | 0.072 (175%) |
| Example 15 | Anode: G Phosphorus: 30 | water 60 ethylene grycol 20 adipic acid 8.0 | 0 | 1.63 | 0.68 | 10 | 2300 | 4.0 | 0.042 | Valve Opened After |

TABLE 2-continued

| | Anode phosphorus (mg/CV) | composition (parts per weight) | azelaic acid (mol/kg) | formic acid (mol/kg) | adipic acid (mol/kg) | specific resistance (Ω cm) | capacitance (μF) | leakage current (μA) | tan δ fresh | tan δ after 4000 hr (change ratio) |
|---|---|---|---|---|---|---|---|---|---|---|
| | | formic acid 6.0 diethylenetriaminepentaacetic acid 1 diammonium hydrogen phosphate 1 p-nitrophenol 1 p-nitrobenzoic acid 0.2 | | | | | | | | 3000 hr (−) |
| Example 16 | Anode: G Phosphorus: 30 | water 60 ethylene grycol 20 adipic acid 8.0 formic acid 4.0 diethylenetriaminepentaacetic acid 1 diammonium hydrogen phosphate 1 p-nitrophenol 1 | 0 | 1.09 | 0.68 | 11 | 2280 | 3.8 | 0.041 | 0.080 (196%) |
| Example 17 | Anode: B Phosphorus: 120 | water 50 ethylene grycol 32 adipic acid 12.0 diethylenetriaminepentaacetic acid 1 diammonium hydrogen phosphate 1 p-nitrophenol 1 p-nitrobenzoic acid 0.2 | 0 | 0 | 1.00 | 30 | 2090 | 3.1 | 0.061 | 0.067 (110%) |
| Example 18 | Anode: G Phosphorus: 30 | water 50 ethylene grycol 32 adipic acid 12.0 diethylenetriaminepentaacetic acid 1 diammonium hydrogen phosphate 1 p-nitrophenol 1 p-nitrobenzoic acid 0.2 | 0 | 0 | 1.00 | 30 | 2270 | 3.8 | 0.063 | 0.082 (130%) |
| Comparative Example 4 | Anode: H Phosphorus: 0 | water 60 ethylene grycol 20 adipic acid 8.0 formic acid 6.0 diethylenetriaminepentaacetic acid 1 diammonium hydrogen phosphate 1 p-nitrophenol 1 p-nitrobenzoic acid 0.2 | 0 | 1.63 | 0.68 | 10 | 2400 | 5.8 | 0.043 | Valve Opened After 1500 hr (−) |
| Comparative Example 5 | Anode: H Phosphorus: 0 | water 50 ethylene grycol 32 adipic acid 12.0 diethylenetriaminepentaacetic acid 1 diammonium hydrogen phosphate 1 p-nitrophenol 1 p-nitrobenzoic acid 0.2 | 0 | 0 | 1.00 | 30 | 2320 | 5.5 | 0.064 | Valve Opened After 2500 hr (−) |
| Comparative Example 6 | Anode: B Phosphorus: 120 | water 50 ethylene grycol 32 adipic acid 12.0 diammonium hydrogen phosphate 1 p-nitrophenol 1 p-nitrobenzoic acid 0.2 | 0 | 0 | 1.00 | 30 | 2320 | 5.5 | 0.064 | Valve Opened After 100 hr (−) |
| Comparative Example 7 | Anode: G Phosphorus: 30 | water 50 ethylene grycol 32 adipic acid 12.0 diammonium hydrogen phosphate 1 p-nitrophenol 1 p-nitrobenzoic acid 0.2 | 0 | 0 | 1.00 | 30 | 2250 | 3.5 | 0.063 | Valve Opened After 100 hr (−) |

The electrolytic solution used in Examples 9 to 15 and Comparative Example 4 containing water in an amount of approximately 60% by weight of the entire electrolytic solution, formic acid of approximately 1.6 moles per kg of the solvent and adipic acid of approximately 0.7 moles per kg of the solvent showed the extremely low specific resistance of 10 Ωcm at 30° C. The electrolytic solution used in Example 16 containing water in an amount of approximately 60% by weight of the entire electrolytic solution and formic acid of 1.1 moles per kg of the solvent as well as adipic acid of approximately 0.7 moles per kg of the solvent showed the remarkably low specific resistance of 11 Ωcm at 30° C. The electrolytic solution used in Examples 17 and 18 as well as Comparative Examples 5 to 7 containing water in an amount of approximately 50% by weight of the entire electrolytic solution, adipic acid of 1.0 moles per kg of the solvent showed the low specific resistance of 30 Ωcm at 30° C. The leakage currents of all the aluminum electrolytic capacitors obtained were excellent. As known from Examples 9 to 15, the capacitance of the capacitor tended to decrease as the amount of phosphorus in the aluminum oxide film of the anode increased.

The capacitor in Comparative Example 4 having the anode without phosphorus in the aluminum oxide film resulted in the valve opening after 1,500 hours elapsed in the non-load test at 105° C. The capacitor in Example 15 having the anode with the phosphorus of 30 mg/CV in terms of phosphoric acid in the aluminum oxide film had twice as large service life as that of the capacitor in Comparative Example 4, but resulted in the valve opening before 4,000 hours elapsed in the non-load test at 105° C. On the other hand, the capacitors having the anode with the phosphorus of 50 mg/CV or more in terms of phosphoric acid in the aluminum oxide film did not result in the valve opening before 4,000 hours elapsed in the non-load test at 105° C. The change ratio of dielectric losses before and after 4,000 hours elapsed in the non-load test at 105° C. tended to be smaller as the content of phosphorus in the aluminum oxide film increased. As known from the comparison of Examples 9 to 11, when the amount of phosphorus in the aluminum oxide film exceeded 100 mg/CV, the effect to inhibit the change of dielectric loss became no longer proportional to the concentration of phosphorus.

Therefore, it has been found that the aluminum electrolytic capacitor that does not result in the valve opening after 3,000 hours elapsed in the non-load test at 105° C. can be obtained by using the anode of which the aluminum oxide film contains phosphorus of 30 to 150 mg/CV in terms of phosphoric acid, even if the electrolytic solution used does not contain azelaic acid and contains formic acid of 1.63 moles per kg of the solvent, and has the remarkably low specific resistance of approximately 10 Ωcm at 30° C. In Example 16, the electrolytic solution used contained less formic acid compared of those of Examples 9 to 15 and does not contain p-nitrobenzoic acid, and the capacitor had the anode of which the aluminum oxide film contains phosphorus of 30 mg/CV in terms of phosphoric acid. The specific resistance of the electrolytic solution used in Example 16 was 11 Ωcm at 30° C., and it has been found that the specific resistance thereof can be lowered to the same level as the electrolytic solutions used in Examples 9 to 11 that contains formic acid of 1.63 moles per kg of the solvent, if the electrolytic solution contains formic acid of 1.09 moles per kg of the solvent. In Example 16, the capacitor did not result in the valve opening after 4,000 hours elapsed in the non-load test at 105° C. and showed the long service life, though the amount of phosphorus in the aluminum oxide film was as little as 30 mg/CV in terms of phosphoric acid.

In Comparative Example 6 in which the anode had phosphorus of 120 mg/CV in terms of phosphoric acid in the aluminum oxide film and the electrolytic solution used contained the phosphoric ions but did not contain the combined product, the capacitor resulted in the valve opening after only 100 hours elapsed in the non-load test at 105° C. In Comparative Example 5 in which the electrolytic solution used contained the combined product but the anode did not have phosphorus in the aluminum oxide film, the capacitor resulted in the valve opening after only 2,500 hours elapsed in the non-load test at 105° C. However, in Example 17 in which the anode had phosphorus of 120 mg/CV in terms of phosphoric acid in the aluminum oxide film and the electrolytic solution used contained the combined product, the capacitor did not result in the valve opening after 4,000 hours elapsed in the non-load test at 105° C., and the change ratio of dielectric losses was 110% (no valve opening after 10,000 hours elapsed). Further, in Comparative Example 7 in which the anode had phosphorus of 30 mg/CV in terms of phosphoric acid in the aluminum oxide film and the electrolytic solution used contained the phosphoric ions but did not contain the combined product, the capacitor resulted in the valve opening after only 100 hours elapsed in the non-load test at 105° C., and in Comparative Example 5 in which the electrolytic solution used contained the combined product but the anode did not have phosphorus in the aluminum oxide film, the capacitor resulted in the valve opening after only 2,500 hours elapsed in the non-load test at 105° C. However, in Example 18 in which the anode had phosphorus of 30 mg/CV in terms of phosphoric acid in the aluminum oxide film and the electrolytic solution used had the combined product, the capacitor did not result in the valve opening after 4,000 hours elapsed in the non-load test at 105° C., and the change ratio of dielectric losses was 130% (no valve opening after 8,000 hours elapsed). The service life of the aluminum electrolytic capacitor in Example 17 exceeds what is expected from the combination of Comparative Examples 5 and 6, and the service life of the aluminum electrolytic capacitor in Example 18 exceeds what is expected from the combination of Comparative Examples 5 and 7. Therefore, it has been found that the service life of an aluminum electrolytic capacitor prolongs remarkably by the synergetic effect of the combined product in the electrolytic solution and the anode with the aluminum oxide film containing the adequate amount of phosphorus.

(3) Influence of Concentrations of Electrolyte and Water in Electrolytic Solution The aluminum electrolytic capacitors were prepared by using the anodes B, E, G, H and using the electrolytic solutions with the different contents of azelaic acid, formic acid, adipic acid and water, and property evaluation was given thereto. Table 3 and 4 below show in a summary form the composition of the electrolytic solution used in each capacitor, molar quantity of azelaic acid per kg of the solvent, molar quantity of formic acid per kg of the solvent, molar quantity of adipic acid per kg of the solvent, the specific resistance of the electrolytic solution at 30° C., the capacitance, the leakage current and the dielectric loss (tan δ) of the fresh capacitor, the dielectric loss after 4,000 hours elapsed at the non-load test at 105° C., the change ratio of dielectric losses before and after 4,000 hours elapsed, and the time elapsed to the valve opening if the capacitor resulted in the valve opening. Table 3 shows examples in which the electrolytic solutions without azelaic acid were used, and Table 4 shows examples in which the electrolytic solutions with azelaic acid were used.

TABLE 3

| | Anode phosphorus (mg/CV) | composition (parts per weight) | azelaic acid (mol/kg) | formic acid (mol/kg) | adipic acid (mol/kg) | specific resistance (Ω cm) | capaci- tance (μF) | leakage current (μA) | tan δ fresh | tan δ after 4000 hr (change ratio) |
|---|---|---|---|---|---|---|---|---|---|---|
| Example 19 | Anode: B Phosphorus: 120 | water 50 ethylene grycol 30 adipic acid 10.0 formic acid 4.0 diethylenetriaminepentaacetic acid 1 diammonium hydrogen phosphate 1 p-nitrophenol 1 p-nitrobenzoic acid 0.2 | 0 | 1.09 | 0.86 | 20 | 2100 | 3.3 | 0.047 | 0.052 (111%) |

TABLE 3-continued

| | Anode phosphorus (mg/CV) | composition (parts per weight) | azelaic acid (mol/kg) | formic acid (mol/kg) | adipic acid (mol/kg) | specific resistance (Ω cm) | capacitance (μF) | leakage current (μA) | tan δ fresh | tan δ after 4000 hr (change ratio) |
|---|---|---|---|---|---|---|---|---|---|---|
| Example 20 | Anode: B Phosphorus: 120 | water 50 ethylene grycol 32 adipic acid 12.0 diethylenetriaminepentaacetic acid 1 diammonium hydrogen phosphate 1 p-nitrophenol 1 p-nitrobenzoic acid 0.2 | 0 | 0 | 1.00 | 30 | 2090 | 3.1 | 0.061 | 0.067 (110%) |
| Example 21 | Anode: E Phosphorus: 60 | water 50 ethylene grycol 30 adipic acid 10.0 formic acid 4.0 diethylenetriaminepentaacetic acid 1 diammonium hydrogen phosphate 1 p-nitrophenol 1 p-nitrobenzoic acid 0.2 | 0 | 1.09 | 0.86 | 20 | 2230 | 3.6 | 0.047 | 0.058 (123%) |
| Example 22 | Anode: E Phosphorus: 60 | water 50 ethylene grycol 32 adipic acid 12.0 diethylenetriaminepentaacetic acid 1 diammonium hydrogen phosphate 1 p-nitrophenol 1 p-nitrobenzoic acid 0.2 | 0 | 0 | 1.00 | 30 | 2260 | 3.7 | 0.061 | 0.069 (113%) |
| Example 23 | Anode: E Phosphorus: 60 | water 60 ethylene grycol 17 adipic acid 8.0 formic acid 9.0 diethylenetriaminepentaacetic acid 1 diammonium hydrogen phosphate 1 p-nitrophenol 1 p-nitrobenzoic acid 0.2 | 0 | 2.54 | 0.71 | 9 | 2330 | 4..1 | 0.039 | 0.07 (179%) |
| Example 24 | Anode: E Phosphorus: 60 | water 60 ethylene grycol 23 adipic acid 8.0 formic acid 3.0 diethylenetriaminepentaacetic acid 1 diammonium hydrogen phosphate 1 p-nitrophenol 1 p-nitrobenzoic acid 0.2 | 0 | 0.79 | 0.66 | 16 | 2250 | 3.9 | 0.049 | 0.061 (124%) |
| Example 25 | Anode: E Phosphorus: 60 | water 60 ethylene grycol 22 adipic acid 12.0 diethylenetriaminepentaacetic acid 1 diammonium hydrogen phosphate 1 p-nitrophenol 1 p-nitrobenzoic acid 0.2 | 0 | 0 | 1.00 | 22 | 2290 | 3.6 | 0.051 | 0.065 (127%) |
| Example 26 | Anode: G Phosphorus: 30 | water 50 ethylene grycol 32 adipic acid 12.0 diethylenetriaminepentaacetic acid 1 diammonium hydrogen phosphate 1 p-nitrophenol 1 p-nitrobenzoic acid 0.2 | 0 | 0 | 1.00 | 30 | 2270 | 3.8 | 0.063 | 0.082 (130%) |
| Example 27 | Anode: G Phosphorus: 30 | water 60 ethylene grycol 17 adipic acid 8.0 formic acid 9.0 diethylenetriaminepentaacetic acid 1 diammonium hydrogen phosphate 1 p-nitrophenol 1 p-nitrobenzoic acid 0.2 | 0 | 2.54 | 0.71 | 9 | 2350 | 4.2 | 0.04 | Valve Opened After 2000 hr (—) |
| Example 28 | Anode: G Phosphorus: 30 | water 60 ethylene grycol 22 adipic acid 12.0 diethylenetriaminepentaacetic acid 1 diammonium hydrogen phosphate 1 p-nitrophenol 1 p-nitrobenzoic acid 0.2 | 0 | 0 | 1.00 | 22 | 2270 | 3.8 | 0.052 | 0.071 (137%) |
| Comparative Example 8 | Anode: H Phosphorus: 0 | water 50 ethylene grycol 30 adipic acid 10.0 formic acid 4.0 diethylenetriaminepentaacetic acid 1 diammonium hydrogen phosphate 1 | 0 | 1.09 | 0.86 | 20 | 2370 | 5.6 | 0.05 | Valve Opened After 2000 hr (—) |

TABLE 3-continued

| | Anode phosphorus (mg/CV) | composition (parts per weight) | azelaic acid (mol/kg) | formic acid (mol/kg) | adipic acid (mol/kg) | specific resistance (Ω cm) | capacitance (μF) | leakage current (μA) | tan δ fresh | tan δ after 4000 hr (change ratio) |
|---|---|---|---|---|---|---|---|---|---|---|
| Comparative Example 9 | Anode: H Phosphorus: 0 | p-nitrophenol 1 p-nitrobenzoic acid 0.2 water 50 ethylene grycol 32 adipic acid 12.0 diethylenetriaminepentaacetic acid 1 diammonium hydrogen phosphate 1 p-nitrophenol 1 p-nitrobenzoic acid 0.2 | 0 | 0 | 1.00 | 30 | 2320 | 5.5 | 0.064 | Valve Opened After 2500 hr (—) |

TABLE 4

| | Anode phosphorus (mg/CV) | composition (parts per weight) | azelaic acid (mol/kg) | formic acid (mol/kg) | adipic acid (mol/kg) | specific resistance (Ω cm) | capacitance (μF) | leakage current (μA) | tan δ fresh | tan δ after 4000 hr (change ratio) |
|---|---|---|---|---|---|---|---|---|---|---|
| Example 29 | Anode: E Phosphorus: 60 | water 60 ethylene grycol 23 adipic acid 4.5 formic acid 5.0 azelaic acid 0.5 diethylenetriaminepentaacetic acid 1 diammonium hydrogen phosphate 1 p-nitrophenol 1 p-nitrobenzoic acid 0.2 | 0.032 | 1.31 | 0.37 | 13 | 2250 | 4.2 | 0.046 | 0.061 (133%) |
| Example 30 | Anode: E Phosphorus: 60 | water 60 ethylene grycol 22 adipic acid 12.0 azelaic acid 0.5 diethylenetriaminepentaacetic acid 1 diammonium hydrogen phosphate 1 p-nitrophenol 1 p-nitrobenzoic acid 0.2 | 0.032 | 0 | 1.00 | 24 | 2230 | 4.1 | 0.052 | 0.062 (119%) |
| Example 31 | Anode: E Phosphorus: 60 | water 60 ethylene grycol 18 adipic acid 16.0 azelaic acid 0.5 diethylenetriaminepentaacetic acid 1 diammonium hydrogen phosphate 1 p-nitrophenol 1 p-nitrobenzoic acid 0.2 | 0.034 | 0 | 1.40 | 22 | 2240 | 4.1 | 0.051 | 0.081 (159%) |
| Example 32 | Anode: G Phosphorus: 30 | water 60 ethylene grycol 18 formic acid 12.0 azelaic acid 4.5 diethylenetriaminepentaacetic acid 1 diammonium hydrogen phosphate 1 p-nitrophenol 1 p-nitrobenzoic acid 0.2 | 0.307 | 3.34 | 0 | 9 | 2350 | 4.3 | 0.043 | Valve Opened After 3000 hr (—) |
| Example 33 | Anode: G Phosphorus: 30 | water 60 ethylene grycol 21 formic acid 9.0 azelaic acid 4.5 diethylenetriaminepentaacetic acid 1 diammonium hydrogen phosphate 1 p-nitrophenol 1 p-nitrobenzoic acid 0.2 | 0.296 | 2.42 | 0 | 11 | 2340 | 4.5 | 0.044 | 0.072 (164%) |
| Example 34 | Anode: G Phosphorus: 30 | water 60 ethylene grycol 24 formic acid 6.0 azelaic acid 4.5 diethylenetriaminepentaacetic acid 1 diammonium hydrogen phosphate 1 p-nitrophenol 1 p-nitrobenzoic acid 0.2 | 0.285 | 1.55 | 0 | 14 | 2290 | 4.1 | 0.045 | 0.057 (127%) |
| Example 35 | Anode: G Phosphorus: 30 | water 60 ethylene grycol 15 | 0.212 | 3.48 | 0.41 | 9 | 2340 | 4.5 | 0.041 | Valve Opened |

TABLE 4-continued

| | Anode phosphorus (mg/CV) | composition (parts per weight) | azelaic acid (mol/kg) | formic acid (mol/kg) | adipic acid (mol/kg) | specific resistance (Ω cm) | capaci-tance (μF) | leakage current (μA) | tan δ fresh | tan δ after 4000 hr (change ratio) |
|---|---|---|---|---|---|---|---|---|---|---|
| Example 36 | Anode: G Phosphorus: 30 | adipic acid 4.5<br>formic acid 12.0<br>azelaic acid 3.0<br>diethylenetriaminepentaacetic acid 1<br>diammonium hydrogen phosphate 1<br>p-nitrophenol 1<br>p-nitrobenzoic acid 0.2<br>water 60<br>ethylene grycol 17 | 0.207 | 2.82 | 0.40 | 10 | 2310 | 4.2 | 0.042 | After 4000 hr (−)<br>0.07 (167%) |
| Example 37 | Anode: G Phosphorus: 30 | adipic acid 4.5<br>formic acid 10.0<br>azelaic acid 3.0<br>diethylenetriaminepentaacetic acid 1<br>diammonium hydrogen phosphate 1<br>p-nitrophenol 1<br>p-nitrobenzoic acid 0.2<br>water 60<br>ethylene grycol 19 | 0.202 | 2.20 | 0.39 | 11 | 2290 | 3.9 | 0.043 | 0.067 (156%) |
| Example 38 | Anode: G Phosphorus: 30 | adipic acid 4.5<br>formic acid 8.0<br>azelaic acid 3.0<br>diethylenetriaminepentaacetic acid 1<br>diammonium hydrogen phosphate 1<br>p-nitrophenol 1<br>p-nitrobenzoic acid 0.2<br>water 60<br>ethylene grycol 23 | 0.192 | 1.05 | 0.37 | 15 | 22210 | 3.3 | 0.047 | 0.057 (121%) |
| Example 39 | Anode: G Phosphorus: 30 | adipic acid 4.5<br>formic acid 4.0<br>azelaic acid 3.0<br>diethylenetriaminepentaacetic acid 1<br>diammonium hydrogen phosphate 1<br>p-nitrophenol 1<br>p-nitrobenzoic acid 0.2<br>water 60<br>ethylene grycol 25 | 0.188 | 0.51 | 0.36 | 18 | 2210 | 3.1 | 0.048 | 0.055 (115%) |
| Example 40 | Anode: G Phosphorus: 30 | adipic acid 4.5<br>formic acid 4.0<br>azelaic acid 3.0<br>diethylenetriaminepentaacetic acid 1<br>diammonium hydrogen phosphate 1<br>p-nitrophenol 1<br>p-nitrobenzoic acid 0.2<br>water 60<br>ethylene grycol 19 | 0.202 | 0 | 1.04 | 24 | 2220 | 3.7 | 0.054 | 0.057 (106%) |
| Example 41 | Anode: G Phosphorus: 30 | adipic acid 12.0<br>azelaic acid 3.0<br>diethylenetriaminepentaacetic acid 1<br>diammonium hydrogen phosphate 1<br>p-nitrophenol 1<br>p-nitrobenzoic acid 0.2<br>water 60<br>ethylene grycol 16 | 0.210 | 1.72 | 0.81 | 13 | 2220 | 3.2 | 0.043 | 0.061 (142%) |
| Example 42 | Anode: G Phosphorus: 30 | adipic acid 9.0<br>formic acid 6.0<br>azelaic acid 3.0<br>diethylenetriaminepentaacetic acid 1<br>diammonium hydrogen phosphate 1<br>p-nitrophenol 1<br>p-nitrobenzoic acid 0.2<br>water 50<br>ethylene grycol 31 | 0.197 | 1.61 | 0.38 | 18 | 2210 | 3.4 | 0.049 | 0.055 (112%) |
| Example 43 | Anode: G Phosphorus: 30 | adipic acid 4.5<br>formic acid 6.0<br>water 40<br>ethylene grycol 41 | 0.197 | 1.61 | 0.38 | 24 | 2210 | 2.9 | 0.055 | 0.058 (105%) |

TABLE 4-continued

| | Anode phosphorus (mg/CV) | composition (parts per weight) | azelaic acid (mol/kg) | formic acid (mol/kg) | adipic acid (mol/kg) | specific resistance (Ω cm) | capacitance (μF) | leakage current (μA) | tan δ fresh | tan δ after 4000 hr (change ratio) |
|---|---|---|---|---|---|---|---|---|---|---|
| Example 44 | Anode: G Phosphorus: 30 | azelaic acid 3.0<br>diethylenetriaminepentaacetic acid 1<br>diammonium hydrogen phosphate 1<br>p-nitrophenol 1<br>p-nitrobenzoic acid 0.2<br>water 30<br>ethylene grycol 50 | 0.033 | 0 | 1.20 | 53 | 2270 | 3.4 | 0.083 | 0.087 (105%) |
| Example 45 | Anode: G Phosphorus: 30 | adipic acid 14.0<br>azelaic acid 0.5<br>diethylenetriaminepentaacetic acid 1<br>diammonium hydrogen phosphate 1<br>p-nitrophenol 1<br>p-nitrobenzoic acid 0.2<br>water 50<br>ethylene grycol 24 | 0.467 | 0 | 1.20 | 26 | 2250 | 3.9 | 0.055 | 0.059 (107%) |
| Example 46 | Anode: G Phosphorus: 30 | adipic acid 13.0<br>azelaic acid 6.5<br>diethylenetriaminepentaacetic acid 1<br>diammonium hydrogen phosphate 1<br>p-nitrophenol 1<br>p-nitrobenzoic acid 0.2<br>water 30<br>ethylene grycol 41.5 | 0.484 | 0 | 1.34 | 52 | 2230 | 4.1 | 0.083 | 0.086 (104%) |
| Example 47 | Anode: G Phosphorus: 30 | adipic acid 14.0<br>azelaic acid 6.5<br>diethylenetriaminepentaacetic acid 1<br>diammonium hydrogen phosphate 1<br>p-nitrophenol 1<br>p-nitrobenzoic acid 0.2<br>water 50<br>ethylene grycol 38<br>adipic acid 6.0<br>azelaic acid 0.5<br>diethylenetriaminepentaacetic acid 1<br>diammonium hydrogen phosphate 1<br>p-nitrophenol 1<br>p-nitrobenzoic acid 0.2 | 0.030 | 0 | 0.47 | 43 | 2230 | 3.7 | 0.067 | 0.071 (106%) |

As known from, for example, the comparison of Examples 23 and 24, formic acid as the electrolyte remarkably lowered the specific resistance of the electrolytic solution, but the change ratio of dielectric loss before and after 4,000 hours elapsed in the non-load test at 105° C. became larger, and the service life of the capacitor was shortened. However, as known from Examples 19 to 23, 25, 27, 28 and Comparative Examples 8 and 9, as the content of phosphorus in the aluminum oxide film of the anode became larger, the capacitor with the long service life was obtained regardless of the existence of formic acid. Further, as known from Table 4, the capacitor with the long service life was obtained by coexisting azelaic acid in the electrolytic solution, even if a large amount of formic acid existed in the electrolytic solution so that the specific resistance was approximately 15 Ωcm at 30° C.

By the comparison of Examples 39 and 40 in which the anode had phosphorus of 30 mg/CV in terms of phosphoric acid in the aluminum oxide film, formic acid of 0.5 moles per kg of the solvent had an effect to lower the specific resistance of the electrolytic solution remarkably. However, as known from Examples 32 and 35, if the content of formic acid in the electrolytic solution exceeded 3 moles per kg of the solvent, the capacitors resulted in the valve opening before 4,000 hour elapsed in the non-load test at 105° C. Therefore, it can be concluded that the content of formic acid should be in the range of 0.5 to 3 moles per kg of the solvent.

It had been also found by the comparison of Examples 41 to 47 that as the water content of the electrolytic solution is larger, the specific resistance of the electrolytic solution becomes lower and the service life of the capacitor tends to become shorter. The electrolytic solution with water in an amount of approximately 40% or more of the entire electrolytic solution showed the low specific resistance of 30 Ωcm or less at 30° C. if formic acid was contained and approximately 40 Ωcm or less at 30° C. if formic acid was not contained. On the other hand, the specific resistance of the electrolytic solution used in Examples 44 and 46 which contained water in an amount of approximately 30% by weight of the electrolytic solution and did not contain formic acid was 50 Ωcm or more at 30° C. However, this specific resistance is remarkably low compared with the specific resistance of approximately 150 Ωcm of the conventional electrolytic solution having ethylene glycol as a main solvent and having water in an amount of approximately 10% by weight of the entire electrolytic solution, and lowers than the specific resistance of approximately 80 Ωcm of the conventional electrolytic solution having γ-butyrolactone as a main solvent. Further, in Example 44, though only about 0.03 moles of azelaic acid per kg of the solvent exist in the electrolytic solution, the capacitor was obtained that showed little change of dielectric loss before and after 4,000 hours elapsed in the non-load test at 105° C. The aluminum electrolytic capacitor of Example 44 does not result in the valve opening after 10,000 hours elapsed in the non-load test at 105 degrees.

(4) Influence of Concentration of Phosphorus in Aluminum Oxide Film of Anode and Concentration of Azelaic Acid in Electrolytic Solution The aluminum electrolytic capacitors were prepared using the anodes E and G and the electrolytic solutions with the different content of azelaic acid, and property evaluation was given to them. Table 5 below shows in a summary form the composition of the electrolytic solution used in each capacitor, molar quantity of azelaic acid per kg of the solvent, molar quantity of formic acid per kg of the solvent, molar quantity of adipic acid per kg of the solvent, the specific resistance of the electrolytic solution at 30° C., the capacitance, the leakage current and the dielectric loss (tan δ) of the fresh capacitor, the dielectric loss after 4,000 and 6,000 hours elapsed at the non-load test at 105° C., the change ratio of dielectric losses before and after 4,000 and 6,000 hours elapsed, and, the time elapsed to the valve opening if the capacitor resulted in the valve opening.

TABLE 5

| | Anode phosphorus (mg/CV) | composition (parts per weight) | azelaic acid (mol/kg) | formic acid (mol/kg) | adipic acid (mol/kg) | specific resistance (Ω cm) | capacitance (μF) | leakage current (μA) | fresh | tan δ after 4000 hr (change ratio) | tan δ after 6000 hr (change ratio) |
|---|---|---|---|---|---|---|---|---|---|---|---|
| Example 48 | Anode: E Phosphorus: 60 | water 60 ethylene grycol 17 adipic acid 4.5 formic acid 6.0 azelaic acid 7.0 diethylenetriaminepentaacetic acid 1 diammonium hydrogen phosphate 1 p-nitrophenol 1 p-nitrobenzoic acid 0.2 | 0.484 | 1.69 | 0.40 | 13 | 2190 | 3.6 | 0.043 | 0.048 (112%) | 0.055 (128%) |
| Example 49 | Anode: E Phosphorus: 60 | water 60 ethylene grycol 19 adipic acid 4.5 formic acid 6.0 azelaic acid 4.5 diethylenetriaminepentaacetic acid 1 diammonium hydrogen phosphate 1 p-nitrophenol 1 p-nitrobenzoic acid 0.2 | 0.303 | 1.65 | 0.39 | 13 | 2190 | 3.6 | 0.043 | 0.05 (116%) | 0.054 (125%) |
| Example 50 | Anode: E Phosphorus: 60 | water 60 ethylene grycol 21 adipic acid 4.5 formic acid 6.0 azelaic acid 3.0 diethylenetriaminepentaacetic acid 1 diammonium hydrogen phosphate 1 p-nitrophenol 1 p-nitrobenzoic acid 0.2 | 0.197 | 1.61 | 0.38 | 13 | 2200 | 3.8 | 0.042 | 0.052 (124%) | 0.053 (127%) |
| Example 51 | Anode: E Phosphorus: 60 | water 60 ethylene grycol 22 adipic acid 4.5 formic acid 6.0 azelaic acid 2.0 diethylenetriaminepentaacetic acid 1 diammonium hydrogen phosphate 1 p-nitrophenol 1 p-nitrobenzoic acid 0.2 | 0.130 | 1.59 | 0.38 | 13 | 2230 | 3.8 | 0.043 | 0.051 (119%) | 0.054 (126%) |
| Example 52 | Anode: E Phosphorus: 60 | water 65 ethylene grycol 10 adipic acid 6.0 formic acid 8.0 azelaic acid 2.0 diethylenetriaminepentaacetic acid 1 diammonium hydrogen phosphate 1 p-nitrophenol 1 p-nitrobenzoic acid 0.2 | 0.142 | 2.32 | 0.55 | 9 | 2220 | 4.1 | 0.039 | 0.053 (135%) | 0.064 (165%) |
| Example 53 | Anode: E Phosphorus: 60 | water 60 ethylene grycol 23 adipic acid 4.5 formic acid 6.0 azelaic acid 1.0 diethylenetriaminepentaacetic acid 1 | 0.064 | 1.57 | 0.37 | 13 | 2210 | 3.9 | 0.042 | 0.056 (127%) | 0.08 (190%) |

TABLE 5-continued

| | Anode phosphorus (mg/CV) | composition (parts per weight) | azelaic acid (mol/kg) | formic acid (mol/kg) | adipic acid (mol/kg) | specific resistance (Ω cm) | capacitance (μF) | leakage current (μA) | tan δ fresh | tan δ after 4000 hr (change ratio) | tan δ after 6000 hr (change ratio) |
|---|---|---|---|---|---|---|---|---|---|---|---|
| Example 54 | Anode: E Phosphorus: 60 | diammonium hydrogen phosphate 1 p-nitrophenol 1 p-nitrobenzoic acid 0.2 water 60 ethylene grycol 23 adipic acid 4.5 formic acid 6.0 azelaic acid 0.55 diethylenetriaminepentaacetic acid 1 | 0.035 | 1.57 | 0.37 | 13 | 2270 | 4.3 | 0.044 | 0.064 (145%) | Valve Opened (−) |
| Example 55 | Anode: E Phosphorus: 60 | diammonium hydrogen phosphate 1 p-nitrophenol 1 water 60 ethylene grycol 23 adipic acid 4.5 formic acid 6.0 azelaic acid 0.5 diethylenetriaminepentaacetic acid 1 | 0.032 | 1.57 | 0.37 | 13 | 2270 | 4.3 | 0.044 | 0.091 (207%) | Valve Opened (−) |
| Example 56 | Anode: E Phosphorus: 60 | diammonium hydrogen phosphate 1 p-nitrophenol 1 p-nitrobenzoic acid 0.2 water 60 ethylene grycol 23 adipic acid 4.5 formic acid 6.0 azelaic acid 0.5 diethylenetriaminepentaacetic acid 1 | 0.032 | 1.70 | 0.37 | 12 | 2270 | 4.3 | 0.044 | 0.068 (155%) | Valve Opened (−) |
| Example 57 | Anode: E Phosphorus: 60 | diammonium hydrogen phosphate 1 p-nitrophenol 1 water 60 ethylene grycol 20 adipic acid 8.0 formic acid 6.0 diethylenetriaminepentaacetic acid 1 diammonium hydrogen phosphate 1 p-nitrophenol 1 p-nitrobenzoic acid 0.2 | 0 | 1.63 | 0.68 | 10 | 2300 | 3.8 | 0.041 | 0.070 (171%) | Valve Opened (−) |
| Example 58 | Anode: G Phosphorus: 30 | water 60 ethylene grycol 17 adipic acid 4.5 formic acid 6.0 azelaic acid 7.0 diethylenetriaminepentaacetic acid 1 diammonium hydrogen phosphate 1 p-nitrophenol 1 p-nitrobenzoic acid 0.2 | 0.484 | 1.69 | 0.40 | 13 | 2200 | 3.9 | 0.045 | 0.055 (122%) | 0.067 (148%) |
| Example 59 | Anode: G Phosphorus: 30 | water 60 ethylene grycol 21 adipic acid 4.5 formic acid 6.0 azelaic acid 3.0 diethylenetriaminepentaacetic acid 1 diammonium hydrogen phosphate 1 p-nitrophenol 1 p-nitrobenzoic acid 0.2 | 0.197 | 1.61 | 0.38 | 13 | 2220 | 3.2 | 0.045 | 0.060 (133%) | 0.072 (160%) |
| Example 60 | Anode: G Phosphorus: 30 | water 60 ethylene grycol 22 adipic acid 4.5 formic acid 6.0 azelaic acid 2.0 diethylenetriaminepentaacetic | 0.130 | 1.59 | 0.38 | 13 | 2230 | 3.9 | 0.044 | 0.062 (140%) | 0.074 (168%) |

TABLE 5-continued

| | Anode phosphorus (mg/CV) | composition (parts per weight) | azelaic acid (mol/kg) | formic acid (mol/kg) | adipic acid (mol/kg) | specific resistance (Ω cm) | capacitance (μF) | leakage current (μA) | tan δ fresh | tan δ after 4000 hr (change ratio) | tan δ after 6000 hr (change ratio) |
|---|---|---|---|---|---|---|---|---|---|---|---|
| Example 61 | Anode: G Phosphorus: 30 | acid 1 diammonium hydrogen phosphate 1 p-nitrophenol 1 p-nitrobenzoic acid 0.2 water 60 ethylene grycol 23 adipic acid 4.5 formic acid 6.0 azelaic acid .0 diethylenetriaminepentaacetic acid 1 diammonium hydrogen phosphate 1 p-nitrophenol 1 p-nitrobenzoic acid 0.2 | 0.064 | 1.57 | 0.37 | 13 | 2240 | 4.2 | 0.045 | 0.076 (169%) | Valve Opened (-) |
| Example 62 | Anode: G Phosphorus: 30 | water 60 ethylene grycol 23 adipic acid 4.5 formic acid 6.0 azelaic acid 0.5 diethylenetriaminepentaacetic acid 1 diammonium hydrogen phosphate 1 p-nitrophenol 1 p-nitrobenzoic acid 0.2 | 0.32 | 1.57 | 0.37 | 13 | 2250 | 4.2 | 0.046 | 0.091 (198%) | Valve Opened (-) |
| Example 63 | Anode: G Phosphorus: 30 | water 60 ethylene grycol 20 adipic acid 8.0 formic acid 6.0 diethylenetriaminepentaacetic acid 1 diammonium hydrogen phosphate 1 p-nitrophenol 1 p-nitrobenzoic acid 0.2 | 0 | 1.63 | 0.68 | 10 | 2300 | 4.0 | 0.042 | Valve Opened after 3000 hr (-) | Valve Opened (-) |

As known from Table 5, as the content of phosphorus in the aluminum oxide film increased or as the content of azelaic acid in the electrolytic solution increased, the change ratio of dielectric losses before and after 4,000 and 6,000 hours elapsed in a non-load test at 105° C. tended to be smaller. The capacitor having the anode with phosphorus of 60 mg/CV in terms of phosphoric acid in the aluminum oxide film had smaller change of dielectric losses in the non-load test at 105° C. compared with the capacitor having the anode with phosphorus of 30 mg/CV in terms of phosphoric acid in the aluminum oxide film, and as the test time becomes longer, the difference in the change ratios of dielectric losses of the two capacitors became larger.

The capacitor having the anode with phosphorus of 60 mg/CV in terms of phosphoric acid in the aluminum oxide film had smaller influence from the concentration of azelaic acid in the electrolytic solution compared with the capacitor having the anode with phosphorus of 30 mg/CV in terms of phosphoric acid in the aluminum oxide film. Especially the capacitors of Examples 48 to 51 which used the electrolytic solution with azelaic acid of 0.13 moles or more per kg of the solvent showed almost the same level of the change ratios of dielectric losses before and after 6,000 hours elapsed in the non-load test at 105° C., namely 130% or less, and these capacitors had the remarkably long service life. Especially, the capacitors in Examples 48-53 having the anode with phosphorus of 60 mg/CV in terms of phosphoric acid in the aluminum oxide film and using the electrolytic solution with azelaic acid of 0.064 moles or more per kg of the solvent did not result in the valve opening after 6,000 hours elapsed in the non-load test at 105° C., and the capacitors in Examples 58 to 60 having the anode with phosphorus of 30 mg/CV in terms of phosphoric acid in the aluminum oxide film and using the electrolytic solution with azelaic acid of 0.130 moles or more per kg of the solvent did not result in the valve opening after 6,000 hours elapsed in the non-load test at 105° C., both of which showed a remarkably long service life.

(5) Comparison of Adipic Acid and Glutaric Acid in Electrolytic Solution

The aluminum electrolytic capacitors were prepared using the anode G and using the electrolytic solutions containing either of adipic acid or glutaric acid, and property evaluation was given to them. Table 6 below shows in a summary form the composition of the electrolytic solution used in each capacitor, molar quantity of azelaic acid per kg of the solvent, molar quantity of adipic acid or glutaric acid per kg of the solvent, the specific resistance of the electrolytic solutions at 30° C., the capacitance, the leakage current and the dielectric loss (tan δ) of the fresh capacitor, the dielectric loss after 4,000 hours elapsed at the non-load test at 105° C., the change ratio of dielectric losses before and after 4,000 hours elapsed, and, the time elapsed to the valve opening if the capacitor resulted in the valve opening.

TABLE 6

| | Anode phosphorus (mg/CV) | composition (parts per weight) | azelaic acid (mol/kg) | formic acid (mol/kg) | adipic acid/ glutaric acid (mol/kg) | specific resistance (Ω cm) | capaci- tance (μF) | leakage current (μA) | tan δ fresh | tan δ after 4000 hr (change ratio) |
|---|---|---|---|---|---|---|---|---|---|---|
| Example 64 | Anode: G Phosphorus: 30 | water 60 ethylene grycol 23 adipic acid 4.5 formic acid 6.0 azelaic acid 0.5 diethylenetriaminepentaacetic acid 1 diammonium hydrogen phosphate 1 p-nitrophenol 1 p-nitrobenzoic acid 0.2 | 0.032 | 1.57 | 0.37 | 13 | 2250 | 4.2 | 0.046 | 0.091 (198%) |
| Example 65 | Anode: G Phosphorus: 30 | water 60 ethylene grycol 19 adipic acid 12.0 azelaic acid 3.0 diethylenetriaminepentaacetic acid 1 diammonium hydrogen phosphate 1 p-nitrophenol 1 p-nitrobenzoic acid 0.2 | 0.202 | 0 | 1.04 | 24 | 2220 | 3.7 | 0.054 | 0.057 (106%) |
| Example 66 | Anode: G Phosphorus: 30 | water 60 ethylene grycol 24 glutaric acid 18.0 formic acid 6.0 azelaic acid 0.5 diethylenetriaminepentaacetic acid 1 diammonium hydrogen phosphate 1 p-nitrophenol 1 p-nitrobenzoic acid 0.2 | 0.032 | 1.55 | 1.62 | 10 | 2290 | 4.6 | 0.047 | Valve Opened after 4000 hr (—) |
| Example 67 | Anode: G Phosphorus: 30 | water 60 ethylene grycol 24 glutaric acid 12.0 formic acid 6.0 azelaic acid 0.5 diethylenetriaminepentaacetic acid 1 diammonium hydrogen phosphate 1 p-nitrophenol 1 p-nitrobenzoic acid 0.2 | 0.032 | 1.55 | 1.08 | 11 | 2290 | 4.6 | 0.047 | 0.07 (149%) |
| Example 68 | Anode: G Phosphorus: 30 | water 60 ethylene grycol 19 glutaric acid 12.0 azelaic acid 3.0 diethylenetriaminepentaacetic acid 1 diammonium hydrogen phosphate 1 p-nitrophenol 1 p-nitrobenzoic acid 0.2 | 0.202 | 0 | 1.15 | 18 | 2220 | 3.9 | 0.047 | 0.052 (106%) |
| Example 69 | Anode: G Phosphorus: 30 | water 60 ethylene grycol 22 adipic acid 12.0 diethylenetriaminepentaacetic acid 1 diammonium hydrogen phosphate 1 p-nitrophenol 1 p-nitrobenzoic acid 0.2 | 0 | 0 | 1.00 | 22 | 2270 | 3.8 | 0.052 | 0.071 (137%) |
| Example 70 | Anode: G Phosphorus: 30 | water 60 ethylene grycol 26 glutaric acid 8.0 diethylenetriaminepentaacetic acid 1 diammonium hydrogen phosphate 1 p-nitrophenol 1 p-nitrobenzoic acid 0.2 | 0 | 0 | 0.70 | 19 | 2230 | 4.1 | 0.050 | 0.056 (112%) |

As known from Examples 65 and 68 of Table 6, glutamic acid lowered the specific resistance of the electrolytic solution better than the same amount of adipic acid.

For the capacitors prepared from the electrolytic solution containing adipic acid and the capacitors prepared from the electrolytic solution containing glutaric acid, the change ratios of dielectric losses before and after 4,000 hours elapsed in the non-load test at 105° C. were equivalent. In Example 66, if formic acid is coexistent and the content of glutaric acid exceeds 1.5 moles per kg of the solvent, the capacitor resulted in the valve opening even if azelaic acid was coexistent. Therefore, it can be concluded that the content of glutaric acid should be 1.5 moles or less per kg of the solvent if formic acid is coexistent.

(6) Comparison of Neutralization by Ammonia and Neutralization by Amine

The aluminum electrolytic capacitors were prepared using anodes B and G and using the electrolytic solutions neutralized by ammonia gas, dimethylamine, or diethylamine, and property evaluation was given to them. The pH values of the electrolytic solutions were all adjusted within the range of 5.7 to 6.3. Table 7 below shows in a summary form the composition of the electrolytic solution used in each capacitor, the specific resistance of the electrolytic solution at 30° C., the capacitance, the leakage current and the dielectric loss (tan δ) of the fresh capacitor, the dielectric loss after 4,000 hours elapsed at the non-load test at 105° C., and the change ratio of dielectric losses before and after 4,000 hours elapsed.

TABLE 7

|  | Anode phosphorus (mg/CV) | composition (parts per weight) | specific resistance (Ω cm) | capacitance (μF) | leakage current (μA) | tan δ fresh | tan δ after 4000 hr (change ratio) |
|---|---|---|---|---|---|---|---|
| Example 71 | Anode: B Phosphorus: 120 | water 60 ethylene grycol 20 adipic acid 8.0 formic acid 6.0 diethylenetriaminepentaacetic acid 1 diammonium hydrogen phosphate 1 p-nitrophenol 1 p-nitrobenzoic acid 0.2 | 10 | 2150 | 3.5 | 0.041 | 0.045 (110%) |
| Example 72 | Anode: B Phosphorus: 120 | water 60 ethylene grycol 20 adipic acid 8.0 formic acid 6.0 dimethylamine 11 diethylenetriaminepentaacetic acid 1 diammonium hydrogen phosphate 1 p-nitrophenol 1 p-nitrobenzoic acid 0.2 | 18 | 2310 | 3.1 | 0.051 | 0.056 (110%) |
| Example 73 | Anode: B Phosphorus: 120 | water 65 ethylene grycol 15 adipic acid 8.0 formic acid 6.0 diethylamine 18 diethylenetriaminepentaacetic acid 1 diammonium hydrogen phosphate 1 p-nitrophenol 1 p-nitrobenzoic acid 0.2 | 28 | 2350 | 3.1 | 0.061 | 0.071 (116%) |
| Example 74 | Anode: G Phosphorus: 30 | water 60 ethylene grycol 21 adipic acid 4.5 formic acid 6.0 azelaic acid 3.0 diethylenetriaminepentaacetic acid 1 diammonium hydrogen phosphate 1 p-nitrophenol 1 p-nitrobenzoic acid 0.2 | 13 | 2220 | 3.2 | 0.045 | 0.060 (133%) |
| Example 75 | Anode: G Phosphorus: 30 | water 60 ethylene grycol 21 adipic acid 4.5 formic acid 6.0 azelaic acid 3.0 dimethylamine 0.7 diethylenetriaminepentaacetic acid 1 diammonium hydrogen phosphate 1 p-nitrophenol 1 p-nitrobenzoic acid 0.2 | 18 | 2290 | 4.3 | 0.048 | 0.057 (119%) |
| Example 76 | Anode: G Phosphorus: 30 | water 65 ethylene grycol 16 adipic acid 4.5 formic acid 6.0 azelaic acid 3.0 diethylamine 14.2 diethylenetriaminepentaacetic acid 1 diammonium hydrogen phosphate 1 p-nitrophenol 1 p-nitrobenzoic acid 0.2 | 29 | 2280 | 4.2 | 0.057 | 0.063 (111%) |

As known from Examples 71 to 73 and 74 to 76 of Table 7, the neutralization by the amine gave the electrolytic solution with the higher specific resistance compared with the neutralization by ammonia. However, in respect to the change ratios of dielectric losses before and after 4,000 hours elapsed at the non-load test at 105° C., the capacitors using the electrolytic solution neutralized by amine showed equivalent or smaller values than the capacitors using the electrolytic solution neutralized by ammonia. Therefore, the aluminum electrolytic capacitor with the long service life was obtained also by the amine neutralization.

INDUSTRIAL APPLICABILITY

The present invention enables to provide the aluminum electrolytic capacitor with low impedance properties and a long service life as well as the electrolytic solution for an aluminum electrolytic capacitor that can provide such capacitor.

What is claimed is:

1. An aluminum electrolytic capacitor comprising:
   an anode constructed from aluminum foil with an aluminum oxide film on the surface;
   a cathode constructed from aluminum foil; and
   a separator holding an electrolytic solution located between the anode and the cathode,
   wherein the anode comprises phosphorus in an amount of 30 to 150 mg per unit CV product in terms of phosphoric acid in the aluminum oxide film, and the electrolytic solution comprises a solvent containing water, an electrolyte selected from the group consisting of a carboxylic acid and a carboxylic salt, and a combined product of a phosphorus oxoacid ion and an aqueous aluminum chelate complex.

2. The aluminum electrolytic capacitor according to claim 1, wherein phosphorus in the aluminum oxide film of the anode is introduced in the aluminum oxide film by a formation treatment of the anode in an aqueous solution comprising at least one compound selected from the group consisting of phosphoric acid and a phosphoric salt.

3. The aluminum electrolytic capacitor according to claim 1, wherein the electrolytic solution has a specific resistance of 30 Ωcm or less at 30° C.

4. The aluminum electrolytic capacitor according to claim 1, wherein the electrolytic solution comprises, as the electrolyte, at least one compound selected from the group consisting of formic acid, a formic acid salt, adipic acid, an adipic acid salt, glutaric acid and a glutaric acid salt.

5. The aluminum electrolytic capacitor according to claim 1, wherein the water content in the electrolytic solution is from 20 to 80% by weight of the overall electrolytic solution.

6. The aluminum electrolytic capacitor according to claim 1, wherein the electrolytic solution comprises, as the electrolyte, at least one compound selected from the group consisting of azelaic acid and an azelaic acid salt.

7. The aluminum electrolytic capacitor according to claim 1, wherein the electrolytic solution comprises:
   a phosphorus oxoacid ion-generating compound which can generate a phosphorus oxoacid ion in an aqueous solution; and
   a chelating agent which can coordinate with aluminum to form an aqueous aluminum chelate complex,
   wherein the electrolytic solution comprises, as the electrolytes, at least one compound selected from the group consisting of azelaic acid and an azelaic acid salt and at least one compound selected from the group consisting of formic acid, a formic acid salt, adipic acid, an adipic acid salt, glutaric acid and a glutaric acid salt, and the content of the at least one compound selected from the group consisting of azelaic acid and an azelaic acid salt is at least 0.03 moles per kg of the solvent and at most a saturated amount at 50° C. in the electrolytic solution,
   the electrolytic solution comprises an aluminum ion, and a combined product of a phosphorus oxoacid ion and an aqueous aluminum chelate complex is formed in the electrolytic solution by reaction of the aluminum ion and the chelating agent and a phosphorus oxoacid ion generated from the phosphorus oxoacid ion-generating compound, and
   the electrolytic solution is placed in an aluminum electrolytic capacitor and the aluminum ion is provided by elution from an anode and a cathode of the aluminum electrolytic capacitor.

8. The aluminum electrolytic capacitor according to claim 1, wherein the electrolytic solution comprises:
   a phosphorus oxoacid ion-generating compound which can generate a phosphorus oxoacid ion in an aqueous solution; and
   a chelating agent which can coordinate with aluminum to form an aqueous aluminum chelate complex,
   wherein the electrolytic solution comprises, as the electrolytes, at least one compound selected from the group consisting of azelaic acid and an azelaic acid salt in an amount of 0.03 to 0.5 moles per kg of the solvent and at least one compound selected from the group consisting of formic acid, a formic acid salt, adipic acid, an adipic acid salt, glutaric acid and a glutaric acid salt,
   the electrolytic solution comprises an aluminum ion, and a combined product of a phosphorus oxoacid ion and an aqueous aluminum chelate complex is formed in the electrolytic solution by reaction of the aluminum ion and the chelating agent and a phosphorus oxoacid ion generated from the phosphorus oxoacid ion-generating compound, and
   the electrolytic solution is placed in an aluminum electrolytic capacitor and the aluminum ion is provided by elution from an anode and a cathode of the aluminum electrolytic capacitor.

* * * * *